(12) United States Patent
Dangui et al.

(10) Patent No.: US 8,407,036 B2
(45) Date of Patent: *Mar. 26, 2013

(54) METHOD AND APPARATUS FOR MODELING THE MODAL PROPERTIES OF OPTICAL WAVEGUIDES

(75) Inventors: Vinayak Dangui, Stanford, CA (US); Michel J. F. Digonnet, Palo Alto, CA (US); Gordon S. Kino, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 800 days.

This patent is subject to a terminal disclaimer.

(21) Appl. No.: 12/369,671

(22) Filed: Feb. 11, 2009

(65) Prior Publication Data

US 2009/0192769 A1      Jul. 30, 2009

Related U.S. Application Data

(63) Continuation of application No. 11/223,216, filed on Sep. 9, 2005, now Pat. No. 7,505,881.

(60) Provisional application No. 60/608,765, filed on Sep. 11, 2004.

(51) Int. Cl.
    *G06F 17/50*      (2006.01)
(52) U.S. Cl. .......................................... 703/14
(58) Field of Classification Search ........................ 703/6
    See application file for complete search history.

(56) References Cited

U.S. PATENT DOCUMENTS

| 2003/0023417 | A1 | 1/2003 | Chen et al. |
| 2005/0024628 | A1 | 2/2005 | Golowich et al. |
| 2005/0185908 | A1 | 8/2005 | Roberts et al. |
| 2006/0009956 | A1* | 1/2006 | Winckel et al. ................... 703/2 |

OTHER PUBLICATIONS

Kenji Kawano et al., "Finite-difference time-domain method," 2001, in "Introduction to Optical Waveguide Analysis: Solving Maxwell's Equations and the Schrodinger Equation," John Wiley & Sons, pp. 233-249.*
Sonja Zentner Pilinsky et al., "The accuracy of boundary conditions in finite-difference analysis of pulse propagation in optical fiber," May 12, 2004, Proceedings of the 12th IEEE Mediterranean Electrotechnical Conference, pp. 23-26.*
Sai-Tak Chu et al., "A finite-difference time-domain method for the design and analysis of guided-wave optical structures," 1989, Journal of Lightwave Technology, vol. 7, No. 12, pp. 2033-2038.*
Alan George, Joseph W. Liu: "Computer Solution of Large Sparse Positive Definite Systems," 1981, Prentice-Hall, Chapter 4 pp. 48-51.
Examination Report for EP Application 05843332.7 datd Aug. 19, 2009.

(Continued)

*Primary Examiner* — Dwin M Craig
*Assistant Examiner* — Russ Guill
(74) *Attorney, Agent, or Firm* — Knobbe, Martens, Olson & Bear LLP

(57) ABSTRACT

A method and apparatus models one or more electromagnetic field modes of a waveguide. The method includes calculating a first matrix having a plurality of elements and having a first bandwidth using a refractive index profile of the waveguide. The plurality of elements of the first matrix represents an action of Maxwell's equations on a transverse magnetic field within the waveguide. The method further includes rearranging the plurality of elements of the first matrix to form a second matrix having a second bandwidth smaller than the first bandwidth. The method further includes shifting the second matrix and inverting the shifted second matrix to form a third matrix. The method further includes calculating one or more eigenvalues or eigenvectors of the third matrix corresponding to one or more modes of the waveguide.

21 Claims, 13 Drawing Sheets

OTHER PUBLICATIONS

S.J. Liu et al.: "A relaxed iterative domain decomposition method with mulitfrontal algorithm for waveguide problems," Proceedings of IEEE Antennas and Propagation Society International Symposium 2002, Jun. 16, 2002, pp. 452-455, XP010592463.

A. Esposito et al., "A new matrix bandwidth reduction algorithm", 1998, Operations Research Letters, vol. 23, issues 3-5, pp. 99-107.

Allan, Douglas C., et al., Surface modes and loss in air-core photonic band-gap fibers, *Proceedings of SPIE*, vol. 5000, 2003, pp. 161-174.

Broeng, Jes, et al., Photonic Crystal Fibers: A New Class of Optical Waveguides, *Optical Fiber Technology*, vol. 5, 1999, pp. 305-330.

Digonnet, Michel J.F., et al., Simple geometric criterion to predict the existence of surface modes in air-core photonic-bandgap fibers, *Optics Express*, vol. 12, No. 9, May 3, 2004, pp. 1864-1872.

Ferrarini, D., et al., Leakage properties of photonic crystal fibers, *Optics Express*, vol. 10, No. 23, Nov. 18, 2002, pp. 1314-1319.

Johnson, Steven G., et al., Block-iterative frequency-domain methods for Maxwell's equations in planewave basis, *Optics Express*, vol. 8, No. 3, Jan. 29, 2001, pp. 173-190.

Jose Torre-Jimenez et al., "A new measure for the bandwidth minimization problem", 2000, Advances in Artificial Intelligence, pp. 477-486.

Kaiser, P., et al., Low-Loss Single Material Fibers Made From Pure Fused Silica, *The Bell System Technical Journal*. vol. 53, No. 6, Jul.-Aug. 1974, pp. 1021-1039.

Kim, Hyang Kyun, et al., Designing Air-Core Photonic-Bandgap Fibers Free of Surface Modes, *IEEE Journal of Quantum Electronics*, vol. 40, No. 5, May 2004, pp. 551-556.

Knight, J.C., et al., All-silica single mode optical fiber with photonic crystal cladding, *Optical Letters*, vol. 21, No. 19, Oct. 1, 1996, pp. 1547-1549.

Knight, J.C., et al., Photonic crystals as optical fibres-physics and applications, *Optical Materials*, vol. 11, 1999, pp. 143-151.

Kuhlmey, Boris, et al., Chromatic dispersion and losses of microstructured optical fibers, *Applied Optics*, vol. 42, No. 4, Feb. 1, 2003, pp. 634-639.

Poladian, Leon, et al., Fourier decomposition algorithm for leaky modes of fibres with arbitrary geometry, *Optics Express*, vol. 10, No. 10, May 20, 2002, pp. 449-454.

Pottage, J.M., et al., Robust photonic band gaps for hollow core guidance in PCF made from high index glass, *Optics Express*, vol. 11, No. 22, Nov. 3, 2003, pp. 2854-2861.

Qiu, Min, Analysis of Guided Modes in Photonic Crystal Fibers Using the Finite-Difference Time-Domain Method, *Microwave and Optical Technology Letters*, vol. 30, No. 5, Sep. 5, 2001, pp. 327-330.

Rafael Marti et al., "Reducing the bandwidth of a sparse matrix with a tabu search", 2001, vol. 135, pp. 450-459.

R.B. Lehoucq D.C. Sorensen, C Yang; "ARPACK Users Guide: Solution of large scale eigenvalue problems by implicitly restarted Arnoldi methods", 1996.

Renversez, G., Dispersion management with microstructured optical fibers: ultraflattened chromatic dispersion with low losses, *Optics Letters*, vol. 28, No. 12, Jun. 15, 2003, pp. 989-991.

Saitoh, K., et al., Air-core photonic band-gap fibers: the impact of surface modes, *Optics Express*, vol. 12, No. 3, Feb. 9, 2004, pp. 394-400.

Saitoh, K., et al., Chromatic dispersion control in photonic crystal fibers: application to ultra-flattened dispersion, *Optics Express*, vol. 11, No. 8, Apr. 21, 2003, pp. 843-852.

Saitoh, K., et al., Full-Vectorial Imaginary-Distance Beam Propagation Method Based on a Finite Element Scheme: Application to Photonic Crystal Fibers, *IEEE Journal of Quantum Electronics*, vol. 38, No. 7, Jul. 2002, pp. 927-933.

Saitoh, K., et al., Leakage loss and group velocity dispersion in air-core photonic bandgap fibers, *Optics Express*, vol. 11, No. 23, Nov. 17, 2003, pp. 3100-3109.

West, James A., et al., Surface modes in air-core photonic band-gap fibers, *Optics Express*, vol. 12, No. 8, Apr. 19, 2004, pp. 1485-1496.

White, T.P., et al., Calculations of air-guided modes in photonic crystal fibers using the multipole method, *Optics Express*, vol. 9, No. 13, Dec. 17, 2001, pp. 721-732.

White, T.P., et al., Confinement losses in microstructured optical fibers, *Optics Letters*, vol. 26, No. 21, Nov. 1, 2001, pp. 1660-1662.

William H. Press et al., "Numerical Recipes in Fortran", second edition, 2001, Cambridge University Press, p. 40.

Windeler, Robert S., et al., *Silica-Air Microstructured Fibers: Properties and Applications*, Lucent Technologies, Bell Laboratories, Murray Hill, NJ, Optical Fiber Communiations Conference, San Diego, CA, Feb. 21-26, 1999, pp. FG1-1 and FG1-2.

Xu, Yong, et al., Asymptotic analysis of Bragg fibers, *Optics Letters*, vol. 25, No. 24, Dec. 15, 2000, pp. 1756-1758.

Yu, Chin-Ping, et al., Applications of the finite difference mode solution method to photonic crystal structures, *Optics and Quantum Electronics*, vol. 36, 2004, pp. 145-163.

Zhi, Wang, et al., Supercell lattice method for photonic crystal fibers, *Optics Express*, vol. 11, No. 9, May 5, 2003, pp. 980-991.

Zhu, Zhaoming, et al., Full-vectorial finite-difference analysis of microstructured optical fibers, *Optics Express*, vol. 10, No. 17, Aug. 26, 2002, pp. 853-864.

Office Action for European Application No. 05843332.7 dated Jul. 6, 2011.

Office Action for Japanese Application No. 531385/2007 dated May 31, 2011.

International Preliminary Report on Patentability in PCT/US2005/032229 dated Mar. 22, 2007.

Office Action for Japanese Application No. 531385/2007 dated Oct. 2, 2012.

* cited by examiner

METHOD AND APPARATUS FOR MODELING THE MODAL PROPERTIES OF OPTICAL WAVEGUIDES

RELATED APPLICATIONS

The present application is a continuation from U.S. patent application Ser. No. 11/223,216, filed Sep. 9, 2005, now U.S. Pat. No. 7,505,881, and incorporated in its entirety by references herein, and which claims priority to U.S. Provisional Application No. 60/608,765, filed Sep. 11, 2004, which is incorporated in its entirety by reference herein.

BACKGROUND OF THE INVENTION

1. Field of the Invention

The present invention relates generally to methods for modeling the properties of waveguides, and more particularly, to methods for modeling the optical properties of optical waveguides, including but not limited to optical fibers.

2. Description of the Related Art

In a photonic-bandgap fiber (PBF), the cladding is a photonic crystal made of a two-dimensional periodic refractive index structure that creates bandgaps, namely regions in the optical frequency or wavelength domain where propagation is forbidden. This structure can be either a series of concentric rings of alternating high and low indices, as in so-called Bragg fibers (see, e.g., Y. Xu, R. K. Lee, and A. Yariv, *Asymptotic analysis of Bragg fibers*, Optics Letters, Vol. 25, No. 24, Dec. 15, 2000, pages 1756-1758) or a two-dimensional periodic lattice of air holes arranged on a geometric pattern (e.g., triangular), as in air-core PBFs. Examples of air-core PBFs are described by various references, including but not limited to, P. Kaiser and H. W. Astle, *Low-loss singe material fibers made from pure fused silica*, The Bell System Technical Journal, Vol. 53, No. 6, July-August 1974, pages 1021-1039; and J. Broeng, D. Mogilevstev, S. E. Barkou, and A. Bjarklev, *Photonic crystal fibers. A new class of optical waveguides*, Optical Fiber Technology, Vol. 5, 1999, pages 305-330.

The air hole that forms the core of an air-core PBF is typically larger than the other holes in the PBF and constitutes a defect in the periodic structure of the PBF which introduces guided modes within the previously forbidden bandgap. PBFs offer a number of unique optical properties, including nonlinearities about two orders of magnitude lower than in a conventional fiber, a greater control over the mode properties, and interesting dispersion characteristics, such as modal phase velocities greater than the speed of light in air. For these reasons, in optical communications and sensor applications alike, PBFs offer exciting possibilities previously not available from conventional (solid-core) fibers.

Since the propagation of light in air-core fibers is based on a very different principle than in a conventional fiber, it is important to develop a sound understanding of the still poorly understood properties of air-core fibers, to improve these properties, and to tailor them to specific applications. Since the fairly recent invention of air-core fibers (see, e.g., J. C. Knight, T. A. Birks, R. F. Cregan, P. St. J. Russell, and J. P. Sandro, "Photonic crystals as optical fibers-physics and applications," Optical Materials, 1999, Vol. 11, pages 143-151), modeling has been an important tool for analyzing the modal properties of air-core PBFs, particularly their phase and group velocity dispersion (see, e.g., B. Kuhlmey, G. Renversez, and D. Maystre, *Chromatic dispersion and losses of microstructured optical fibers*, Applied Optics, Vol. 42, No. 4, 1 Feb. 2003, pages 634-639; K. Saitoh, M. Koshiba, T. Hasegawa, and E. Sasaoka, *Chromatic dispersion control in photonic crystal fibers: application to ultra-flattened dispersion*, Optics Express, Vol. 11, No. 8, 21 Apr. 2003, pages 843-852; and G. Renversez, B. Kuhlmey, and R. McPhedran, *Dispersion management with microstructured optical fibers: ultraflattened chromatic dispersion with low losses*, Optics Letters, Vol. 28, No. 12, Jun. 15, 2003, pages 989-991), transmission spectra (see, e.g., J. C. Knight, T. A. Birks, P. St. J. Russell, and D. M. Atkin, *All-silica single mode optical fiber with photonic crystal cladding*, Optics Letters, Vol. 21, No. 19, Oct. 1, 1996, pages 1547-1549; and R. S. Windeler, J. L. Wagener, and D. J. Giovanni, *Silica-air microstructured fibers: Properties and applications*, Optical Fiber Communications Conference, San Diego, 1999, pages FG1-1 and FG1-2), unique surface modes (see, e.g., D. C. Allan, N. F. Borrelli, M. T. Gallagher, D. Müller, C. M. Smith, N. Venkataraman, J. A. West, P. Zhang, and K. W. Koch, *Surface modes and loss in air-core photonic band-gap fibers*, Proceedings of SPIE Vol. 5000, 2003, pages 161-174; K. Saitoh, N. A. Mortensen, and M. Koshiba, *Air-core photonic band-gap fibers: the impact of surface modes*, Optics Express, Vol. 12, No. 3, 9 Feb. 2004, pages 394-400; J. A. West, C. M. Smith, N. F. Borelli, D. C. Allan, and K. W. Koch, *Surface modes in air-core photonic band-gap fibers*, Optics Express, Vol. 12, No. 8, 19 Apr. 2004, pages 1485-1496; M. J. F. Digonnet, H. K. Kim, J. Shin, S. H. Fan, and G. S. Kino, *Simple geometric criterion to predict the existence of surface modes in air-core photonic-bandgap fibers*, Optics Express, Vol. 12, No. 9, 3 May 2004, pages 1864-1872; and H. K. Kim, J. Shin, S. H. Fan, M. J. F. Digonnet, and G. S. Kino, *Designing air-core photonic-bandgap fibers free of surface modes*, IEEE Journal of Quantum Electronics, Vol. 40, No. 5, May 2004, pages 551-556), and propagation loss (see, e.g., T. P. White, R. C. McPhedran, C. M. de Sterke, L. C. Botton, and M. J. Steel, *Confinement losses in microstructured optical fibers*, Optics Letters, Vol. 26, No. 21, Nov. 1, 2001, pages 1660-1662; D. Ferrarini, L. Vincetti, M. Zoboli, A. Cucinotta, and S. Selleri, *Leakage properties of photonic crystal fibers*, Optics Express, Vol. 10, No. 23, 18 Nov. 2002, pages 1314-1319; and K. Saitoh and M. Koshiba, *Leakage loss and group velocity dispersion in air-core photonic bandgap fibers*, Optics Express, Vol. 11, No. 23, 17 Nov. 2003, pages 3100-3109). However, extensive and systematic parametric studies of these fibers are lacking because simulations of these complex structures are conducted with analytical methods that are either time-consuming, or are not applicable to all PBF geometries. For example, simulating all the modes of a typically single-mode or a few-moded air-core PBF using code currently in use, for example, the MIT Photonic-Band (MPH) code for computing dispersion relations and electromagnetic profiles of the modes of periodic dielectric structures, takes approximately 10 hours on a supercomputer using 16 parallel 2-GHz processors, with a cell size of $10\Lambda \times 10\Lambda$ and a spatial resolution of $\Lambda/16$, where $\Lambda$ is the period of the photonic-crystal cladding. (See, e.g., S. G. Johnson, and J. D. Joannopoulos, *Block-iterative frequency-domain methods for Maxwell's equations in planewave basis*, Optics Express, Vol. 8, No. 3, 29 Jan. 2001, pages 173-190 for further information regarding the MPB code.) Faster computations have been reported using a polar-coordinate decomposition method to model the fundamental mode (effective index and fields) in six minutes (see, e.g., L. Poladian, N. A. Issa, and T. M. Monro, "*Fourier decomposition algorithm for leaky modes of fibres with arbitrary geometry*," Optics Express, 2002, Vol. 10, pages 449-454). However, this high-speed was accomplished by limiting the number of air hole layers to one, and it still required a supercomputer.

In addition, a multipole decomposition method (see, e.g., T. P. White, R. C. McPhedran, L. C. Botten, G. H. Smith and C. Martijn de Sterke, "*Calculations of air-guided modes in photonic crystal fibers using the multipole method,*" *Optics Express*, 2001, Vol. 8, pages 721-732) has been able to model all the modes in a hexagonal PBF with four rings of holes at one wavelength in approximately one hour on a 733-MHz personal computer. This figure would be reduced to a few minutes on a faster personal computer (e.g., approximately 15 minutes on a 3.2-GHz processor.) While this multipole method yields accurate and quick calculations of the modes of PBFs with circular or elliptical hole shapes, it is limited to these shapes and does not work for PBFs with other hole shapes, for example, for PBFs with scalloped cores (which can advantageously avoid undesirable surface modes) or nearly-hexagonal cladding holes (a shape which often occurs in actual air-core fibers). In addition, much finer resolutions are needed to accurately model the extremely small physical features of air-core fibers, in particular their very thin membranes (e.g., often thinner than $\Lambda/100$).

PBFs are typically modeled using numerical methods originally developed for the study of photonic crystals. Most methods are based on solving the photonic-crystal $$\nabla \times \left\{ \frac{1}{\varepsilon(r)} \nabla \times H(r) \right\} = \frac{\omega^2}{c^2} H(r) \qquad (1)$$

where r is a vector (x, y) that represents the coordinates of a particular point in a plane perpendicular to the fiber axis, $\in(r) = n^2(r)$ is the dielectric permeability of the fiber cross-section at this point, where n(r) is the two-dimensional refractive index profile of the fiber, H(r) is the mode's magnetic field vector, $\omega$ is the optical frequency; and c is the speed of light in vacuum. This formulation is most useful for three-dimensional (3D) photonic-bandgap structures, and it is solved by assuming a constant value for the propagation constant $k_z$ and computing the eigenfrequencies $\omega$ for this value.

Various methods have previously been used to solve for modes in the context of air-core PBFs. One previously-used method utilizes the MIT Photonic Bandgap (MPB) code or software which is cited above. Using the MPB code, the solutions of Equation 1 are obtained in the spatial Fourier domain, so the first step is to decompose the mode fields and $1/\in(r)$ in spatial harmonics. Equation 1 is then written in a matrix form and solved by finding the eigenvalues of this matrix. This calculation is done by setting the wavenumber $k_z$ to some value (e.g., $k_0$) and by solving for the frequencies at which a mode with this wavenumber occurs.

Another previously-used method is the beam-propagation method (BPM) (see, e.g., M. Qiu, "*Analysis of guided modes in photonic crystal fibers using the finite-difference time-domain method,*" *Microwave Optics Technology Letters*, 2001, Vol. 30, pages 327-330). In the BPM, a pseudo-random field is launched into the fiber, which excites different modes with different effective indices. The propagation axis is transformed into an imaginary axis, so that the effective indices become purely imaginary and the fiber modes become purely lossy. Instead of accumulating phase at different rates, the modes now attenuate at different rates, which allow the BPM method to separate them and extract them iteratively by propagating them through a length of fiber. The mode with the lowest effective index, which attenuates at the smallest rate, is extracted first, and the other modes are computed in order of increasing effective index.

Another previously-used method is the finite domain time difference method (FDTD), which solves the time-dependent Maxwell's equations:

$$\begin{cases} \nabla \times E = -\mu_0 \dfrac{\partial H}{\partial t} \\ \nabla \times H = \varepsilon_0 \varepsilon(r) \dfrac{\partial E}{\partial t} \end{cases} \qquad (2)$$

Solving these equations requires considering the time variable as well (see, e.g., J. M. Pottage, D. M. Bird, T. D. Hedley, T. A. Birks, J. C. Knight, P. J. Roberts, and P. St. J. Russell, *Robust photonic band gaps for hollow core guidance in PBF made from high index glass*, *Optics Express*, Vol. 11, No. 22, 3 Nov. 2003, pages 2854-2861).

Another previously-used method involves using a two-dimensional mode eigenvalue equation, where the eigenvalue is the mode effective index. The mode is then expanded either in plane-waves (see, e.g., K. Saitoh and M. Koshiba, "*Full-vectorial imaginary-distance beam propagation method based on finite element scheme: Application to photonic crystal fibers,*" *IEEE Journal of Quantum Electronics*, 2002, Vol. 38, pages 927-933) or in wavelet functions (see, e.g., W. Zhi, R. Guobin, L. Shuqin, and J. Shuisheng, *Supercell lattice method for photonic crystal fibers*, *Optics Express*, Vol. 11, No. 9, 5 May 2003, pages 980-991). The refractive index profile is decomposed in Fourier components, and the resulting matrix equation is solved for eigenvalues and eigenvectors.

When applied to the calculation of the modes of a PBF, the foregoing previously-used methods suffer from a number of disadvantages. One disadvantage is that computation times can be extremely long. Another disadvantage is that techniques that rely on a mode expansion require calculating the Fourier transform of the refractive index profile of the fiber. For PBFs and other types of waveguides, the refractive index profile contains very fine features (e.g., thin membranes) and abrupt refractive index discontinuities (e.g., at the air-glass interfaces), both of which are key to the mode behavior, so a large number of harmonics should ideally be retained to faithfully describe these features. However, because retaining these large numbers of harmonics would require much more memory and computer processing power than is available, even in supercomputers, the discontinuities in the refractive index profile are smoothened, which artificially widens the fine features (e.g., membranes). This standard practice results in significant differences between the refractive index profile that is being modeled and the actual refractive index profile, which in turn introduces systematic errors in the calculations.

Another disadvantage is that some existing mode solvers must calculate the modes of the highest order bands first and work their way down to lower-order modes, and this process propagates computation errors. This requirement also increases computation time, since it forces the computer to calculate more modes than the ones of interest. In addition, as described above, the multipole decomposition method only works for a few specific hole shapes (e.g., circular and elliptical), thus making this technique less versatile.

SUMMARY OF THE INVENTION

In certain embodiments, a method models one or more electromagnetic field modes of a waveguide. The method comprises sampling a two-dimensional cross-section of the waveguide. The method further comprises calculating a first matrix comprising a plurality of elements and having a first bandwidth using the sampled two-dimensional cross-section of the waveguide. The plurality of elements of the first matrix represents an action of Maxwell's equations on a transverse magnetic field within the waveguide. The method further comprises rearranging the plurality of elements of the first matrix to form a second matrix having a second bandwidth smaller than the first bandwidth. The method further comprises shifting the second matrix and inverting the shifted second matrix to form a third matrix. The method further comprises calculating one or more eigenvalues or eigenvectors of the third matrix which correspond to one or more modes of the waveguide.

In certain embodiments, a computer system models one or more electromagnetic field modes of a waveguide. The computer system comprises means for sampling a two-dimensional cross-section of the waveguide. The computer system further comprises means for calculating a first matrix using the sampled two-dimensional cross-section of the waveguide. The first matrix comprises a plurality of elements and has a first bandwidth. The plurality of element of the first matrix represents an action of Maxwell's equations on a transverse magnetic field within the waveguide. The computer system further comprises means for rearranging the plurality of elements of the first matrix to form a second matrix having a second bandwidth smaller than the first bandwidth. The computer system further comprises means for shifting the second matrix and inverting the shifted second matrix to form a third matrix. The computer system further comprises means for calculating one or more eigenvalues or eigenvectors of the third matrix which correspond to one or more modes of the waveguide.

DETAILED DESCRIPTION

Figure 1:
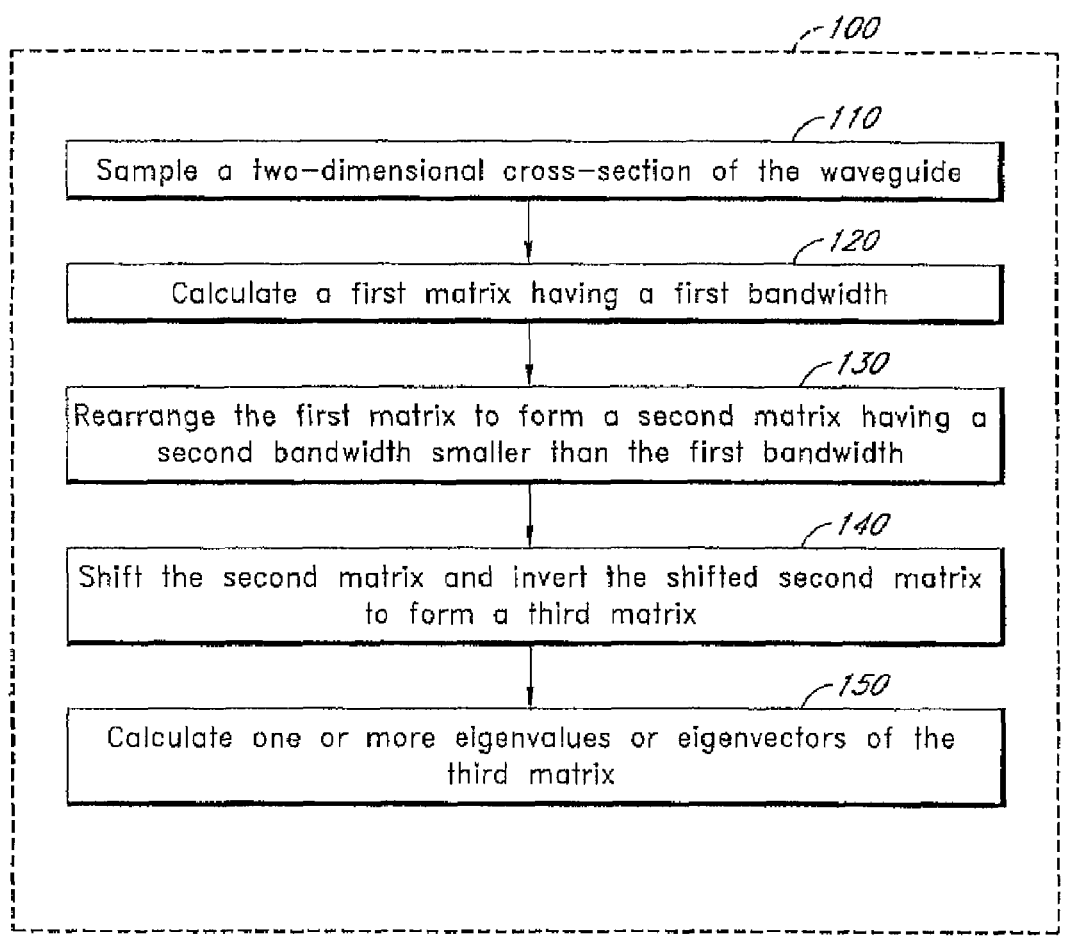
FIG. 1 is a flow diagram of an exemplary method compatible with certain embodiments described herein.

Certain embodiments described herein advantageously provide the ability to quickly and accurately model PBFs of any geometry, as well as other waveguides with complex structures and fine features. For example, certain embodiments described herein are compatible for modeling PBFs having a single core or multiple cores, and comprising air holes, silica material, or other materials. In certain embodiments, finite-difference or finite-element calculations are advantageously used in combination with a shift-invert technique to solve a magnetic field eigenvalue equation in a sparse matrix form to find the modes (e.g., core, surface, ring, and bulk modes) of a PBF having an arbitrary index profile. In certain embodiments, a technique for advantageously reducing the bandwidth of the sparse matrix is applied, which advantageously further reduces the computation time (e.g., by a factor of 10). As compared to a plane-wave expansion, certain embodiments described herein advantageously reduce the computation time by about three orders of magnitude and advantageously cut down the amount of required data storage by about two orders of magnitude. Certain such embodiments advantageously enable full simulations of all the mode properties of a given fiber to be calculated quickly on a personal computer. In addition, certain embodiments described herein are simple to implement (e.g., using only approximately 200 lines of code in MATLAB®, available from The MathWorks of Natick, Mass.).

In finite-difference or finite-element calculations, the waveguide index profile is sampled (or digitized) and the gradients involved in the mode equation are approximated by finite-difference equations. Such finite-difference or finite-element calculations have previously been successfully applied to holey fibers and other waveguides (see, e.g., Z. Zhu and T. G. Brown, "*Full-vectorial finite-difference analysis of microstructured optical fibers*," Optics Express, 2002, Vol. 10, pages 853-864; and C. Yu and H. Chang, "*Applications of the finite difference mode solution method to photonic crystal structures*," Optics And Quantum Electronics, 2004, Vol. 36, pages 145-163), but they have not yet been adapted for modeling PBFs.

Certain embodiments described herein advantageously model the fields and propagation constants of the modes (e.g., core, cladding, surface modes, etc.) of a waveguide with an arbitrary index profile $n(x,y)$ that is translation invariant along the waveguide's longitudinal axis ($z$). For example as described more fully below, in certain embodiments, the waveguide comprises an optical fiber. As is well known in the art, the transverse magnetic field $h_T(r)$ of the waveguide modes satisfies the eigenvalue equation:

$$\{\nabla_T + k_0^2(n^2(x,y) - n_{\mathit{eff}}^2)\}h_T = (\nabla_T \times h_T) \times \nabla_T(\ln n^2(x,y)) \qquad (3)$$

where:

$$k_0 = \frac{2\pi}{\lambda_0}$$

($\lambda_0$ is the wavelength), $h_T = h_x(x, y)u_x + h_y(x, y)u_y$ is the transverse magnetic field, $h_x$ and $h_y$ are the components of the transverse magnetic field projected onto the unit vectors $u_x$ and $u_y$, $$\nabla_T = \frac{\partial}{\partial x}u_x + \frac{\partial}{\partial y}u_y;$$

and $n_{eff}$ is the mode effective index. With this notation, the total magnetic field vector H is simply $h_T+h_z u_z$, where $u_z$ is the unit vector along the fiber z axis and $h_z$ is the longitudinal magnetic field. Equation 3 is satisfied by all modes (TE, TM, and hybrid modes). The longitudinal component of the magnetic field and the components of the electric field can all be calculated from the transverse magnetic field using:

$$\begin{cases} h_z = \frac{i}{k_0 n_{eff}} \nabla_T \cdot h_T \\ e_T = -\left(\frac{\mu_0}{\varepsilon_0}\right)^{1/2} \frac{1}{k_0 n^2} u_z \times \left\{ k_0 n_{eff} h_T - \frac{1}{k_0 n_{eff}} \nabla_T (\nabla_T \cdot h_T) \right\} \\ e_z = i\left(\frac{\mu_0}{\varepsilon_0}\right)^{1/2} \frac{1}{k_0 n^2} u_z \cdot (\nabla_T \times h_T) \end{cases} \quad (4)$$

Equation 3 is vectorial and has two equations that couple the two components $h_x(x,y)$ and $h_y(x,y)$ of the transverse magnetic field, and thus they are solved simultaneously. Note that the form of Equation 3 is such that it can be solved by fixing the wavelength and calculating all the fiber modes at this wavelength.

FIG. 1 is a flow diagram of an exemplary method 100 for modeling one or more electromagnetic field modes of a waveguide in accordance with certain embodiments described herein. In an operational block 110, a two-dimensional cross-section of the waveguide is sampled. In an operational block 120, a first matrix comprising a plurality of elements and having a first bandwidth is calculated using the sampled two-dimensional cross-section of the waveguide. The plurality of elements of the first matrix represents an action of Maxwell's equations on a transverse magnetic field within the waveguide. In an operational block 130, the plurality of elements of the first matrix is rearranged to form a second matrix having a second bandwidth smaller than the first bandwidth. In an operational block 140, the second matrix is shifted and inverted to form a third matrix. In an operational block 150, one or more eigenvalues or eigenvectors of the third matrix are calculated. The one or more eigenvalues or eigenvectors correspond to the one or more modes of the waveguide.

In certain embodiments, sampling the two-dimensional cross-section of the waveguide in the operational block 110 comprises digitizing a refractive index profile of the waveguide. For example, for an air-core PBF, sampling the two-dimensional cross-section of the fiber comprises digitizing the features of the fiber (e.g., the core, the cladding structure comprising the air holes and the intervening membranes) in a planar cross-section which is perpendicular to the fiber longitudinal axis. In certain embodiments, sampling is done over an area that reflects the crystal periodicity (e.g., over an area corresponding to a minimum cell that is a fundamental component of the cladding's photonic-crystal structure). In certain embodiments, sampling includes defining the boundary conditions (e.g., periodic boundary conditions, fixed boundary conditions). Depending on (i) the level of complexity of the fiber profile, (ii) the desired modeling accuracy, and (iii) the scanning accuracy, this sampling can be carried out in certain embodiments by using a scanner and digitizing the scanned image using a computer, or in certain other embodiments by entering the fiber profile as a series of mathematical objects (e.g., a pattern of circles of given radii centered on a periodic grid in the case of a particular air-core fiber) and digitizing this mathematical construct with a computer.

In certain embodiments, calculating the first matrix M in the operational block 120 comprises discretizing the eigenvalue equation (e.g., Equation 3). This discretization is performed in certain embodiments using the following expressions of Maxwell's equations:

$$\begin{cases} \vec{\nabla} \times \vec{E} = \frac{-\partial \vec{B}}{\partial t} \\ \vec{\nabla} \times \vec{H} = \frac{\partial \vec{D}}{\partial t} \\ \nabla \cdot \vec{H} = 0 \end{cases} \quad (5)$$

These expressions of Maxwell's equations advantageously yield a simpler expression for the discretized Maxwell equation matrix, as well as a faster computation. Other expressions of Maxwell's equations may be used in other embodiments.

In certain such embodiments, the discretization of the eigenvalue equation (e.g., Equation 3) is performed using a finite-difference technique based on Yee's cell to account for the field and refractive index discontinuities (see, e.g., Z. Zhu and T. G. Brown, *"Full-vectorial finite-difference analysis of microstructured optical fibers,"* Optics Express, 2002, Vol. 10, pages 853-864). In certain embodiments, the discretization further comprises index-averaging over each discretization pixel that straddles an air-core boundary. In certain embodiments, index-averaging comprises assigning a refractive index to a pixel which is equal to a weighted average of the refractive indices of the media that are straddled by the pixel, in proportion to the relative surface of the media. For example, if the modeled waveguide is a photonic-bandgap fiber comprising air holes in silica (two media only), the index assigned by index-averaging to a pixel that straddles 20% of air and 80% of silica is $n_{aver}=0.2n_{air}+0.8n_{silica}$, where $n_{ave}$ is the index-averaged refractive index, $n_{air}$ is the refractive index of air, and $n_{silica}$ is the refractive index of silica. In certain other embodiments, index-averaging comprises using a harmonic average by calculating the inverse of the average of the inverses of the indices. Other index-averaging techniques are also compatible with embodiments described herein. In certain such embodiments, index-averaging advantageously improves the accuracy of the computation at the cost of smoothing the refractive index structure over a small percentage of the total number of pixels.

In certain embodiments, after discretization, the eigenvalue equation can be written as:

$$\Pi h_T = k_0^2 n_{eff}^2 h_T \quad (6)$$

In Equation 6, $\Pi$ is a linear operator acting on a vector field. In certain embodiments, to solve this equation, the eigenvalue problem is discretized by sampling the two fields $h_x(x, y)$ and $h_y(x, y)$ in a planar cross-section perpendicular to the fiber longitudinal axis on a grid of $m_x$ points in the x direction and $m_y$ points in the y direction. This operation yields a new magnetic field vector h(x, y) of dimension $1\times 2m_x m_y$, which contains (arranged using some arbitrary numbering system) $S=m_x m_y$ samples of $h_x(x, y)$ and S samples of $h_y(x, y)$. In certain embodiments, this sampling is done over an area that reflects the crystal periodicity (e.g., over an area corresponding to a minimum cell that is a fundamental component of the fiber cross-section's photonic-crystal structure). In certain embodiments, this sampling is performed over the entire fiber cross-section.

In certain embodiments, the first matrix is calculated in the operational block 120 by discretizing the linear operator Π using finite-difference equations. In certain embodiments, discretizing the linear operator Π entails sampling the refractive index profile n(x, y) of the fiber, so that it is represented by a first matrix M of dimension 2S×2S. In certain embodiments, this sampling is carried out on the same S×S grid as the grid used to sample the magnetic field.

In certain embodiments, the eigenvalue equation, as expressed by Equation 6, is solved subject to standard boundary conditions. Unlike with a k-domain method, which relies on the Bloch theorem and thus must use periodic boundary conditions, certain such embodiments can use one of the following types of boundary conditions: (1) fields vanishing outside the simulation area; (2) periodic boundary conditions, namely fiber cross-section and fields periodically repeated over the entire space, with the simulation domain as a unit supercell; (3) surrounding the simulation domain by an absorbing material (e.g., for propagation loss calculation); or (4) perfectly matching boundary conditions. Other embodiments can utilize other boundary conditions, depending on the waveguide being modeled. In certain embodiments, both the boundary conditions and the simulation domain boundary are taken into account when sampling the operator Π, so that this information is also contained in the first matrix M itself.

In certain embodiments, the eigenvalue equation can be expressed as a single matrix equation:

$$Mh = k_0^2 n_{eff}^2 h \quad (7)$$

As described above, the first matrix M is calculated from the linear operator Π by discretizing the eigenvalue equation. Finding the roots of Equation 7 (e.g., the eigenvalues $n_{eff}$ and the eigenmodes or field distributions of the fiber modes) is a typical matrix eigenvalue problem. However, the operator matrix M is typically extremely large. For example, consider the case of a photonic-bandgap fiber with a triangular pattern of circular air holes of radius ρ=0.47Λ, and a circular core of radius R=0.8Λ, 8 rows of air holes in the cladding, and a square cladding boundary. The cell is then sixteen periods on each side, therefore it has dimensions of 16Λ×16Λ. To resolve the fiber's thin membranes and achieve sufficient accuracy, a grid step size (or resolution) of Λ/30 can be advantageously used. The number of sampling points is then $m_x$=16×30 in x and $m_y$=16×30 in y. Thus S=$m_x m_y$=230,400, and the first matrix M contains $(2S)^2$≈212 billion elements. Finding the eigenvalues of matrices this large without using methods compatible with certain embodiments described herein is out of the range of most computers.

Figure 2:
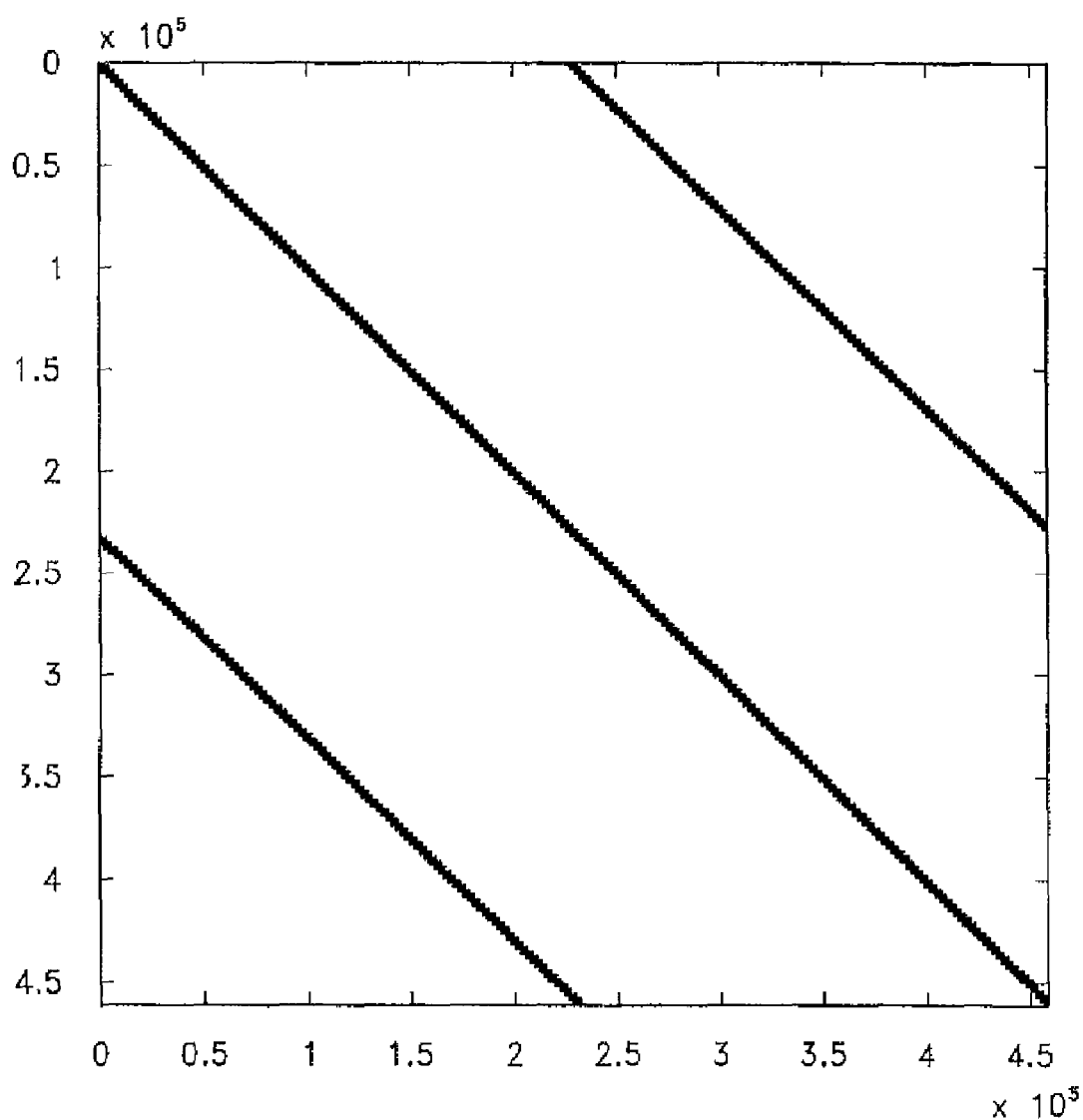
FIG. 2 illustrates a first matrix M, which represents the mode equation for a PBF with a rectangular boundary.

However, the replacement of the differential operators by their finite-difference equivalents makes the first matrix M a sparse matrix. FIG. 2 illustrates the general form of the first matrix M representing the mode equation for the above example. The horizontal and vertical axes of FIG. 2 represent the coordinate of the elements in the first matrix M, which each go up to a maximum value of 2S=460,800. The solid dots, which merge into solid curves where their density is too high to be individually resolved in FIG. 2, represent non-zero elements. The blanks between these elements are all zero elements. In this particular example, the total number of non-zero elements $n_z$ is 2,370,736. The matrix density D of this type of matrix, defined as the ratio of non-zero elements to the total number of elements, is $$\frac{5}{2S} \le D \le \frac{7}{2S},$$

the exact value depending on the index profile. In the foregoing example, the matrix density is only of the order of D≈1.1× $10^{-5}$, or equivalently, only about 0.0011% of the matrix elements are non-zero. The implication is that in spite of the large size of the first matrix M, the number of elements that must be stored during computation is comparatively low, down from approximately 212 billion to approximately 2.4 million for this typical example, which is well within the range of what can be handled with standard personal computers.

Another parameter of the first matrix M is its bandwidth $B_M$, which is defined as the maximum distance between a non-zero coefficient and the first diagonal:

$$B_M = \max_{(i,j); M(i,j) \ne 0} |i - j| \quad (8)$$

Figure 3:
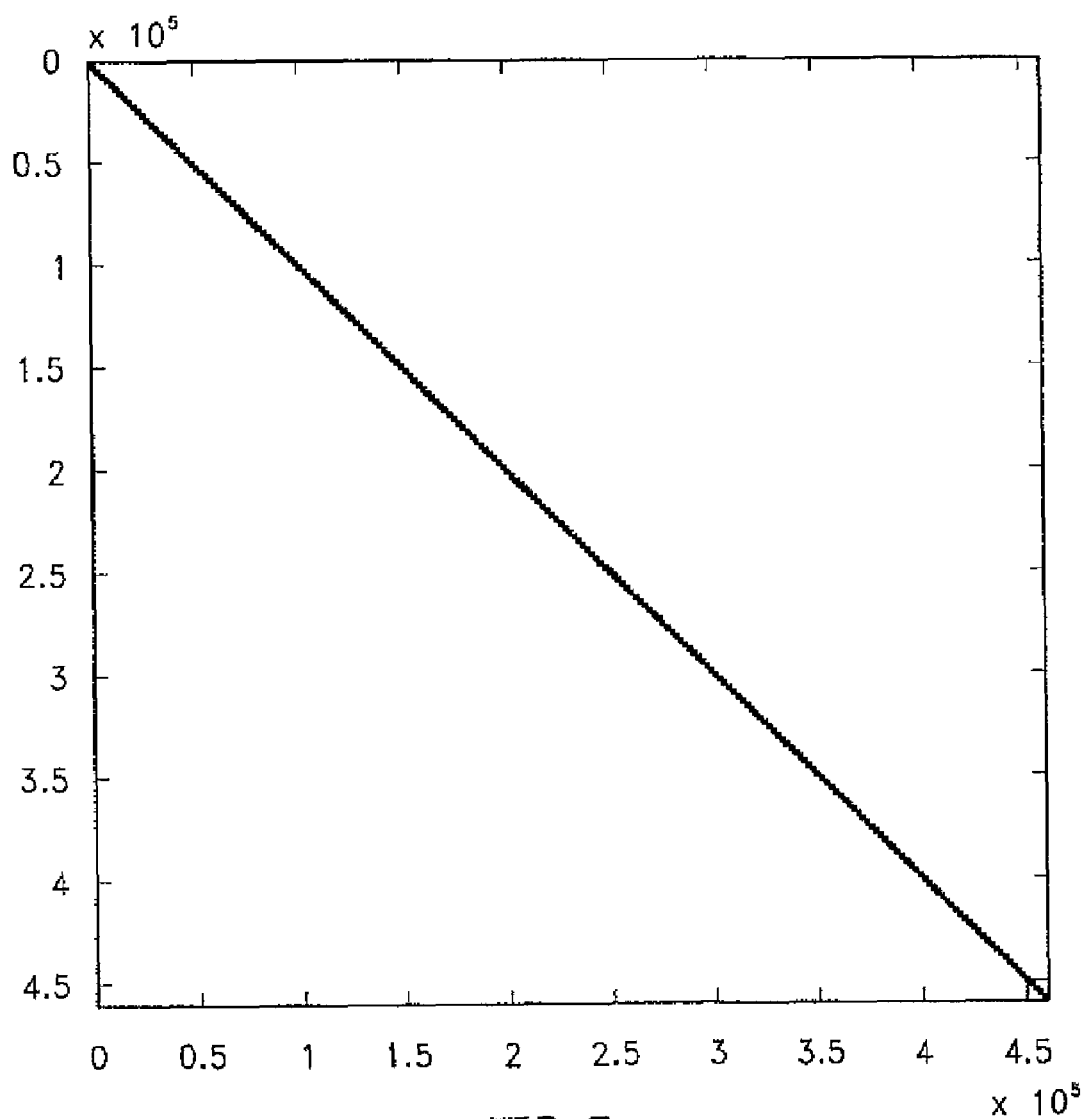
FIG. 3 illustrates a second matrix N obtained by rearrangement of the first matrix M to reduce matrix bandwidth.

Small bandwidths are advantageous for the fast computation of eigenvalues in sparse matrices. The bandwidth of the first matrix M is proportional to S and can be quite large, as illustrated in FIG. 2. In certain embodiments, the bandwidth is advantageously lowered in the operational block 130 by rearranging the $(2S)^2$ elements of the first matrix M to form a second matrix N having a bandwidth smaller than that of the first matrix M. In certain such embodiments, rearranging the first matrix M comprises applying a permutation on the elements of both h and M (see, e.g., A. George and J. Liu, "*Computer Solution of Large Sparse Positive Definite Systems*," Prentice-Hall, 1981). In certain such embodiments, this operation leads to a second matrix N in which all the non-zero elements are clustered near the first diagonal and the bandwidth is therefore greatly reduced. The second sparse matrix N and the new permutated magnetic field vector g produced by this operation also satisfy Equation 7 (e.g., N g=$k_0^2 n_{eff}^2$ g). In certain embodiments, the second matrix N has the same dimensions as the first matrix M. The bandwidth of the second matrix N is proportional to $\sqrt{S}$, so it is greatly reduced compared to the bandwidth of the first matrix M. FIG. 3 illustrates the second matrix N obtained by applying this process to the first matrix M of FIG. 2. Most of the non-zero elements are now close to the diagonal. The bandwidth has been reduced from 460,320 (for the first matrix M of FIG. 2) to only 1,922 (for the second matrix N of FIG. 3), which is a reduction by a factor of approximately 240. In certain embodiments, this reduction of the bandwidth advantageously speeds up the calculation of the eigenvalues of the matrix.

In principle, in certain embodiments, the modes of the fiber can be found by diagonalizing the second matrix N to find all of its eigenvalues. However, such an approach would require calculating and storing a very large number of eigenvalues and eigenvectors, thereby taking a lot of time and memory. Furthermore, such an approach is generally wasteful because it calculates all of the eigenvalues, even those not of interest. More specifically, it would calculate all of the extremely high number of bulk (cladding) modes of a fiber, as well as its few core modes, whereas in general, knowledge of the cladding modes is not of interest. In certain other embodiments, Equation 7 is solved by calculating only the few eigenvalues of interest. This restriction is not unreasonable, since in general the primary interest is to find only the few core modes and a few bulk modes near the edges of the bandgap for an air-gap fiber. In certain such embodiments, the problem can thus be restated as calculating the m eigenvalues of the second matrix N that are closest to a given effective index value $n_0$, where m is a small number. For example, to model the bandgap edges and effective indices of the modes within the bandgap of a particular air-core fiber at a particular wavelength, the $m_0=10$ modes that are closest to $n_0=1$ can be calculated, since the core modes of an air-core fiber have effective indices close to 1.

Calculating the eigenvalues of a large sparse matrix that are closest to a given value is still a difficult task. To reduce the difficulty of this task, certain embodiments use the property that the $m_0$ eigenvalues of a matrix N that are closest to some value $n_0$ are the same as the largest (in amplitude) eigenvalues of a third matrix A, which can be calculated from the second matrix N using:

$$A=(N-k_0^2 n_0^2 I)^{-1} \quad (9)$$

where I is the identity matrix (see, e.g., W. Zhi, R. Guobin, L. Shuqin, and J. Shuisheng, "*Supercell lattice method for photonic crystal fibers*," *Optics Express*, 2003, Vol. 11, pages 980-991). This property is useful in certain embodiments because the eigenvalues of maximum amplitude of a given matrix A can be calculated very fast by using the Courant-Fischer theorem (see, e.g., R. A. Horn and C. R. Johnson, *Matrix Analysis*, Chapter 4, Cambridge University Press, London, 1983). In certain embodiments, the Courant-Fischer theorem is used because it restricts its eigenvalue search to small blocks of dimension $m_0$ within the matrix, which is much faster than identifying all the eigenvalues.

In certain embodiments, the method 100 further comprises shifting the second matrix N and inverting the shifted second matrix to form the third matrix A in the operational block 140. Similar "shift-invert" techniques have previously been used in plane-wave expansions (see, e.g., W. Zhi, R. Guobin, L. Shuqin, and J. Shuisheng, "*Supercell lattice method for photonic crystal fibers*," *Optics Express*, 2003, Vol. 11, pages 980-991), but have not been used as described herein. In certain such embodiments, the second matrix is shifted (e.g., by calculating a new matrix $N-k_0^2 n_0^2 I$), and is then inverted (e.g., by calculating the inverse of the matrix $N-k_0^2 n_0^2 I$) to calculate the third matrix A. In certain embodiments, the inverse matrix is calculated using a standard LU decomposition (in which the matrix is expressed as the product of a lower and an upper triangular matrices) to obtain the third matrix A (see, e.g., R. A. Horn and C. R. Johnson, "*Matrix Analysis*," Chapter 3, Section 5, Cambridge University Press, 1990). This calculation is fast in certain embodiments because $N-k_0^2 n_0^2 I$ is also a sparse matrix with a small bandwidth.

In certain embodiments, the method 100 further comprises calculating one or more eigenvalues or eigenvectors of the third matrix A in the operational block 150. The one or more eigenvalues or eigenvectors correspond to one or more modes of the waveguide. In certain embodiments in which the waveguide comprises a PBF having a bandgap, this calculation comprises finding one or more modes of the PBF. The one or more modes of the PBF comprises at least one core mode, surface mode, ring mode, or bulk mode near the bandgap. In certain embodiments, as stated above, the Courant-Fischer theorem is used to calculate only the $m_0$ largest eigenvalues of A, which are the effective indices of interest. It can be seen that in certain embodiments described herein, the method 100 has transformed the problem from looking for a specific set of eigenvalues around a given value, which is a difficult problem, to looking for the largest eigenvalues of a transformed matrix, which is considerably faster.

In certain embodiments in which more detailed features in the electromagnetic field distribution of a particular mode are desired (e.g., the tail in one of the air holes surrounding the core), certain embodiments utilize results obtained with a coarser grid as the new boundary conditions for extending the calculations to a finer grid, as is possible with other finite-difference or finite-element methods. Thus, this process can effectively zoom in to calculate the electromagnetic fields in a specific portion of the waveguide. In certain embodiments, this process can give access to very fine features of PBF modes.

Figure 4:
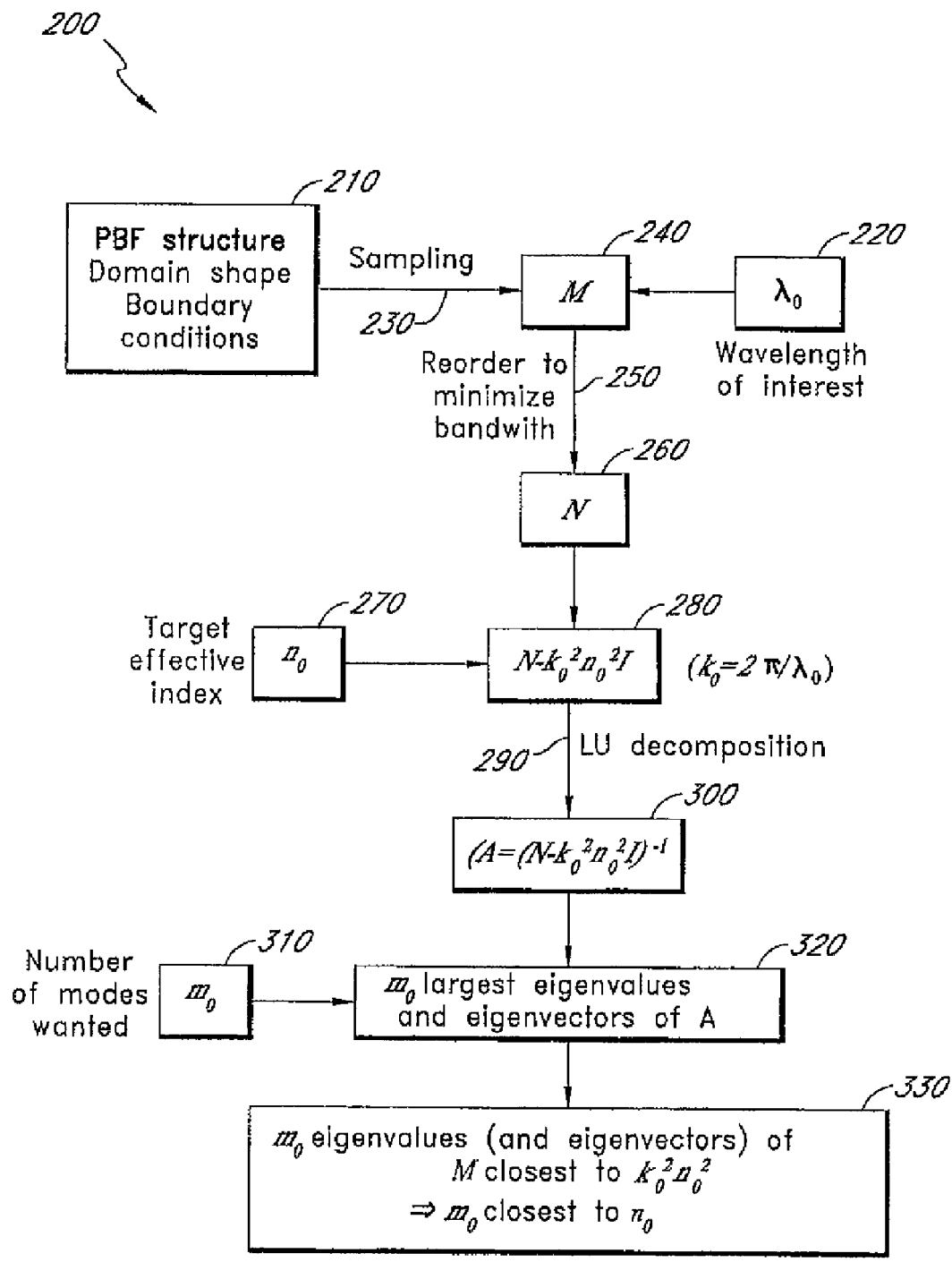
FIG. 4 is a flow diagram illustrating an exemplary method for modeling a PBF in accordance with certain embodiments described herein.

FIG. 4 is another flow diagram illustrating an exemplary method 200 for modeling a PBF in accordance with certain embodiments described herein. The refractive index profile distribution of the fiber, including the structure, the domain shape, and the boundary conditions, is provided as an input, as shown in FIG. 4 by the block 210. The wavelength of interest is also provided as an input, as shown in FIG. 4 by the block 220. The refractive index profile distribution of the fiber is sampled, as shown in FIG. 4 by the arrow 230. The sparse first matrix M, representing the action of Maxwell's equations on the transverse magnetic field, is calculated, as shown in FIG. 4 by the block 240, using the sampled refractive index profile distribution as well as the wavelength and the boundary conditions.

As shown in FIG. 4 by the arrow 250, the first matrix M is rearranged to yield a sparse second matrix N, shown by the block 260, with a reduced bandwidth to speed up the extraction of the eigenvalues. The effective index $n_0$ around which the PBF modes are to be calculated is provided as an input, as shown in FIG. 4 by the block 270. The second matrix N is shifted, shown in FIG. 4 by block 280, and the shifted matrix is inverted (e.g., using the LU decomposition shown in FIG. 4 by arrow 290) to provide the third matrix A, shown in FIG. 4 by block 300. The highest eigenvalues of the third matrix A are the eigenvalues closest to the effective index $n_0$. The number of modes $m_0$ to be calculated is provided as an input, as shown in FIG. 4 by block 310, and the largest eigenvalues and eigenvectors of the third matrix A are calculated (e.g., using the Courant-Fisher theorem), as shown in FIG. 4 by block 320. This calculation provides the $m_0$ eigenvalues (modes) whose effective indices are closest to the effective index $n_0$, as shown in FIG. 4 by the block 330. In certain embodiments, this calculation also provides the $m_0$ eigenvectors (all three components of the electric and magnetic fields of each mode) corresponding to each of these modes.

Certain embodiments described herein are useful in computer-implemented modeling of the modal properties of waveguides (e.g., photonic-bandgap fibers). The general-purpose computers used for such modeling can take a wide variety of forms, including network servers, workstations, personal computers, mainframe computers and the like. The code which configures the computer to perform such analyses is typically provided to the user on a computer-readable medium, such as a CD-ROM. The code may also be downloaded by a user from a network server which is part of a local-area network (LAN) or a wide-area network (WAN), such as the Internet.

The general-purpose computer running the software will typically include one or more input devices, such as a mouse, trackball, touchpad, and/or keyboard, a display, and computer-readable memory media, such as random-access memory (RAM) integrated circuits and a hard-disk drive. It will be appreciated that one or more portions, or all of the code may be remote from the user and, for example, resident on a network resource, such as a LAN server, Internet server, network storage device, etc. In typical embodiments, the software receives as an input a variety of information concerning the waveguide (e.g., structural information, dimensions, refractive index profiles, wavelengths, number of modes, target index).

In certain embodiments, this mode-solving method 200 can be implemented straightforwardly using any one of a number of commercial mathematical software programs. For example, as described more fully below, the mode solver method 200 can be implemented using MATLAB®, available from The MathWorks of Natick, Mass., in which most of the desired mathematical operations are readily available. For example, MATLAB® provides various libraries of code (e.g., ARPACK and UMFPACK) that compute the largest eigenvalues of a matrix using the Courant-Fisher theorem mentioned above. Using such built-in features of commercially-available mathematical software programs and as a result of the relative simplicity of certain embodiments of the mode-solving method described herein, certain embodiments described herein utilize only minimal programming, with the section of code corresponding to the mode solving containing less than approximately 200 lines of code.

Certain embodiments described herein advantageously provide considerably speedier and easier simulations of PBFs than do other waveguide simulators. In addition, certain embodiments described herein advantageously do not require a supercomputer. For example, in certain embodiments, the mode solving method is performed on a personal computer with a 3.2-GHz Pentium® IV processor and 4 gigabytes of RAM. In certain such embodiments, the mode solver finds the propagation constants and fields of 20 modes in a given fiber in approximately four minutes per wavelength for a rectangular grid with 500 points on each side. Conversely, applying the MPB code (cited above), which is based on a plane-wave expansion technique, to the same problem takes approximately one hour using sixteen 2-GHz parallel processors, and such a calculation simply cannot be done in a reasonable time on a personal computer.

In certain embodiments, the simulator code which implements the mode solving method is very short (e.g. less than 200 lines). In certain embodiments, the method advantageously samples the exact refractive index distribution. In certain embodiments, the method uses the wavelength as the variable parameter, which is a more intuitive approach traditionally used to model conventional fibers and optical waveguides. In certain embodiments, the method does not calculate all the modes, but only calculates desired modes, and can be used with a variety of boundary conditions. In certain embodiments, the method models refractive index distributions with negative or complex values, which makes it possible to estimate mode propagation losses using perfectly matching boundary conditions.

Figure 5:
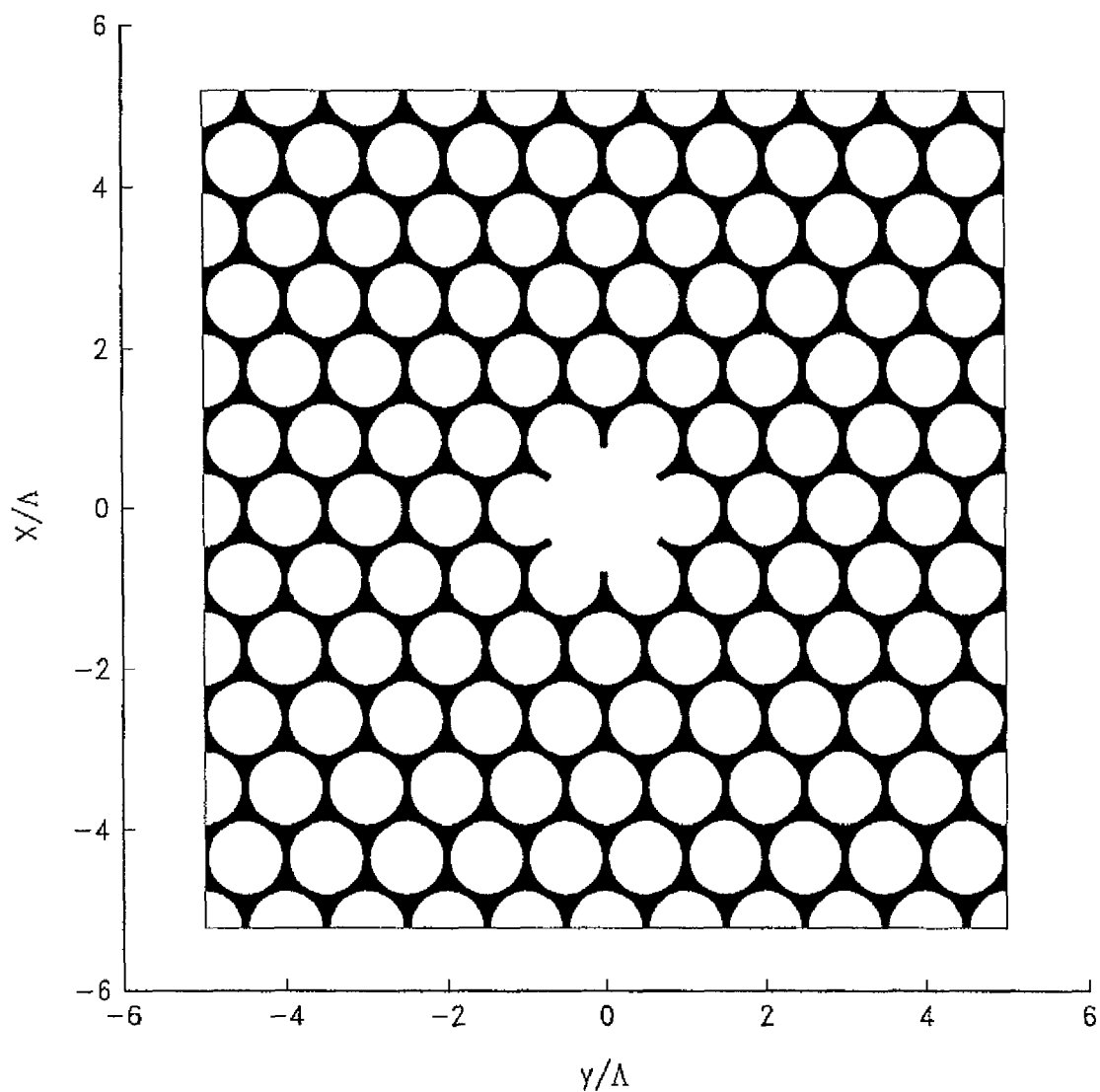
FIG. 5 illustrates sampling of a refractive index structure used for modeling an air-core PBF having a cladding air hole radius $\rho=0.47\Lambda$ and a core radius $R=0.8\Lambda$ under periodic boundary conditions.

In the following description, the performance of an exemplary embodiment is illustrated by applying it to model the propagation constants (or equivalently, the effective mode indices) and intensity profiles (or equivalently the electric and magnetic field spatial distributions) of selected modes of an air-core PBF with circular air holes in a triangular lattice in silica. The fiber cross-section used in the simulation is shown in FIG. 5, which has a circular air-hole with a radius $\rho=0.47\Lambda$ and a radius of the circular air core $R=0.8\Lambda$. The black areas of FIG. 5 represent silica with regions of air therebetween. The PBF structure of FIG. 5 exhibits a bandgap for $\rho>0.43\Lambda$. In the following description, the modeling was done using periodic boundary conditions. In particular, the simulation domain (supercell) represented in FIG. 5 was repeated periodically to tile the entire space, and the modes of this periodic waveguide were calculated. The separation distance between two fiber cores in this periodic tiling was selected to be large enough (e.g., 9Λ) to ensure negligible interaction between neighboring fiber cores and thus to ensure accurate predictions. The simulation domain was therefore a rectangle 9Λ wide (slightly under five rings), a size commonly used in simulations because it offers a good compromise between accuracy on one hand and computing time and memory requirements on the other hand. The sampling of the fiber refractive index distribution, and thus the digitization of the fiber features (e.g., circular air core and cladding air holes) was done with a spatial resolution of Λ/50. This finite resolution accounts for the small irregularities visible at the edge of the holes in FIG. 5.

Figure 6:
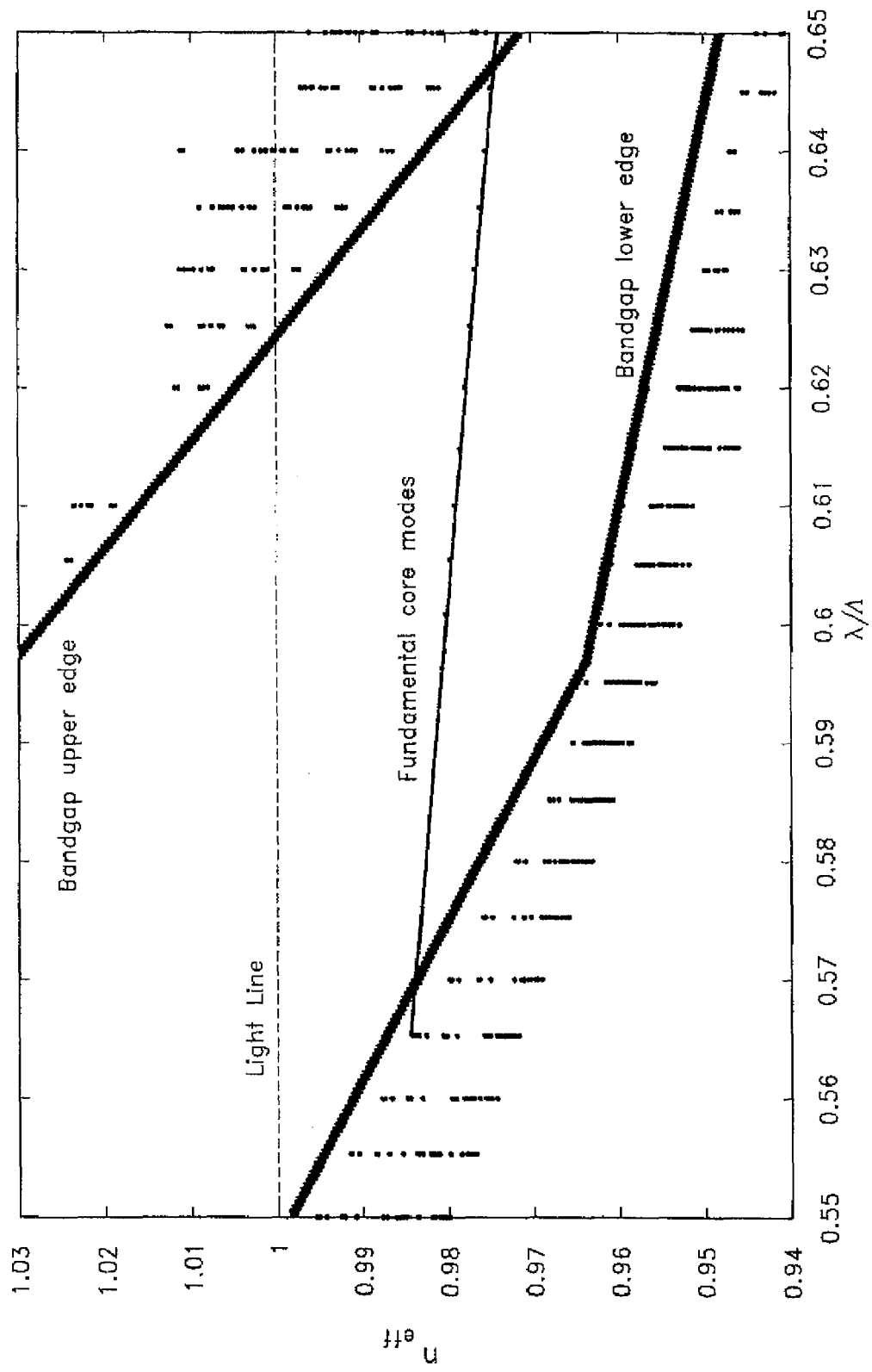
FIG. 6 illustrates a calculated band profile and dispersion of the two fundamental modes for the PBF illustrated by FIG. 5 having $\rho=0.47\Lambda$ and $R=1.0\Lambda$.
Figure 7A:
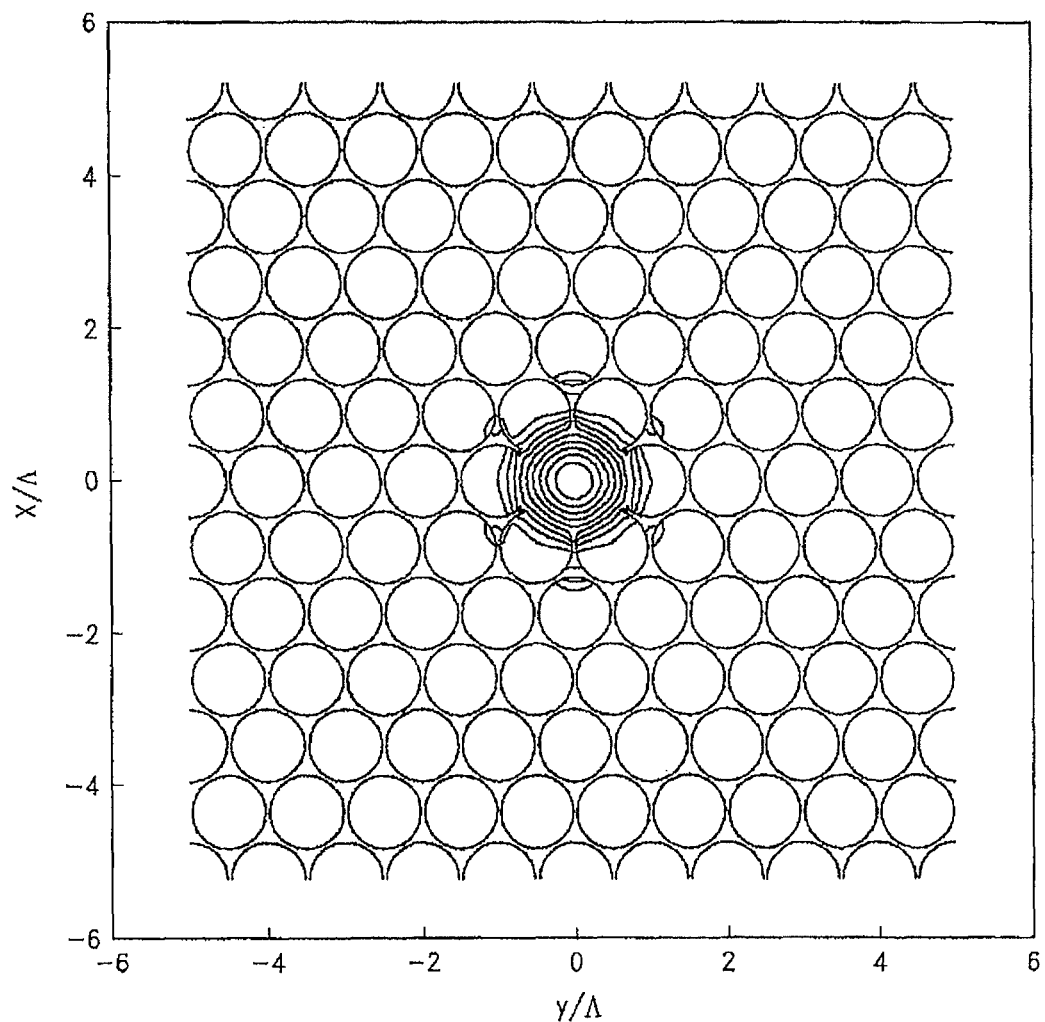
FIGS. 7A and 7B illustrate a calculated mode intensity profile of a core mode for the PBF illustrated by FIG. 5 at $\rho=0.47\Lambda$, $R=0.8\Lambda$, and $\lambda=0.60\Lambda$.
Figure 7B:
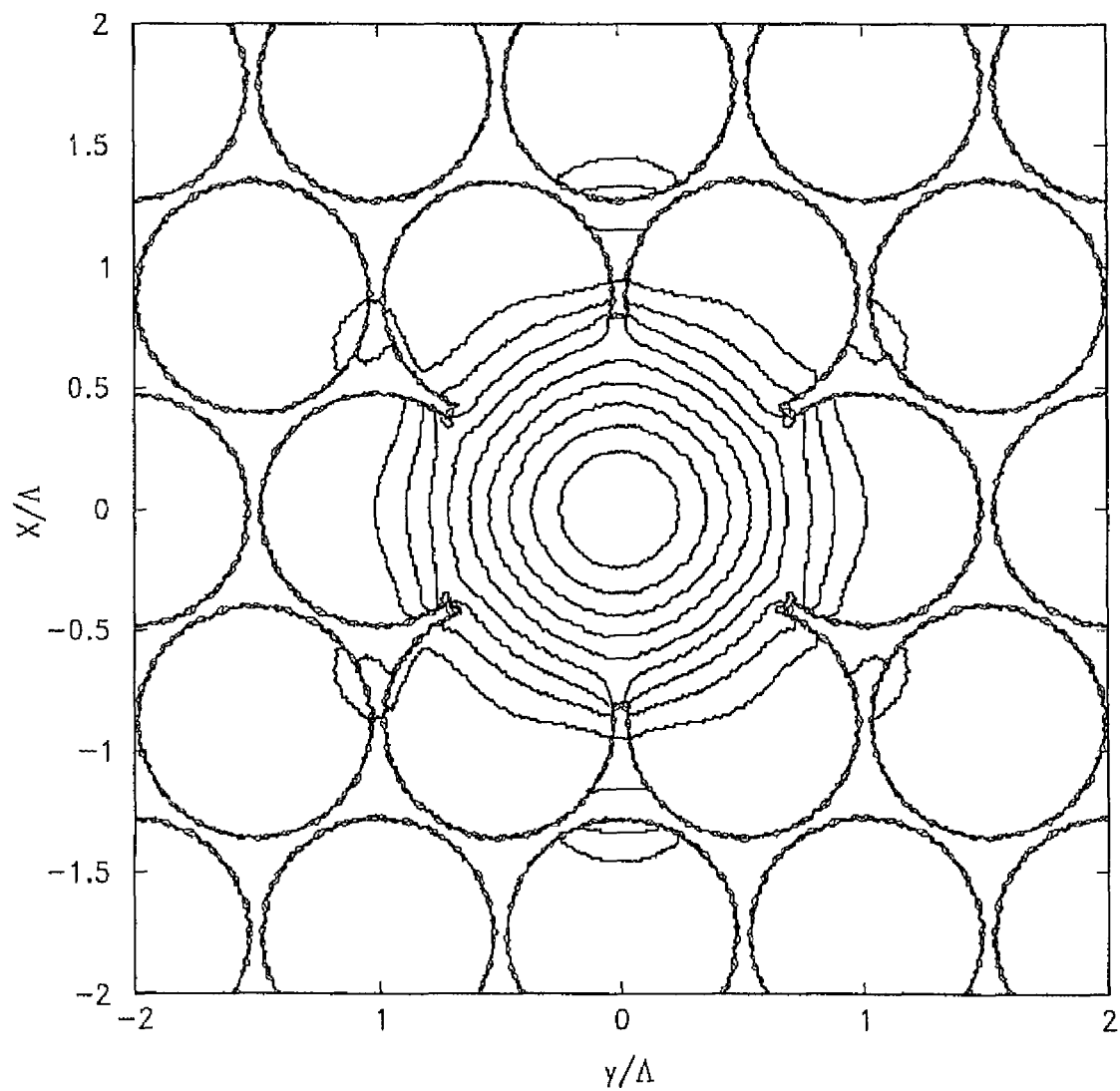
Figure 8:
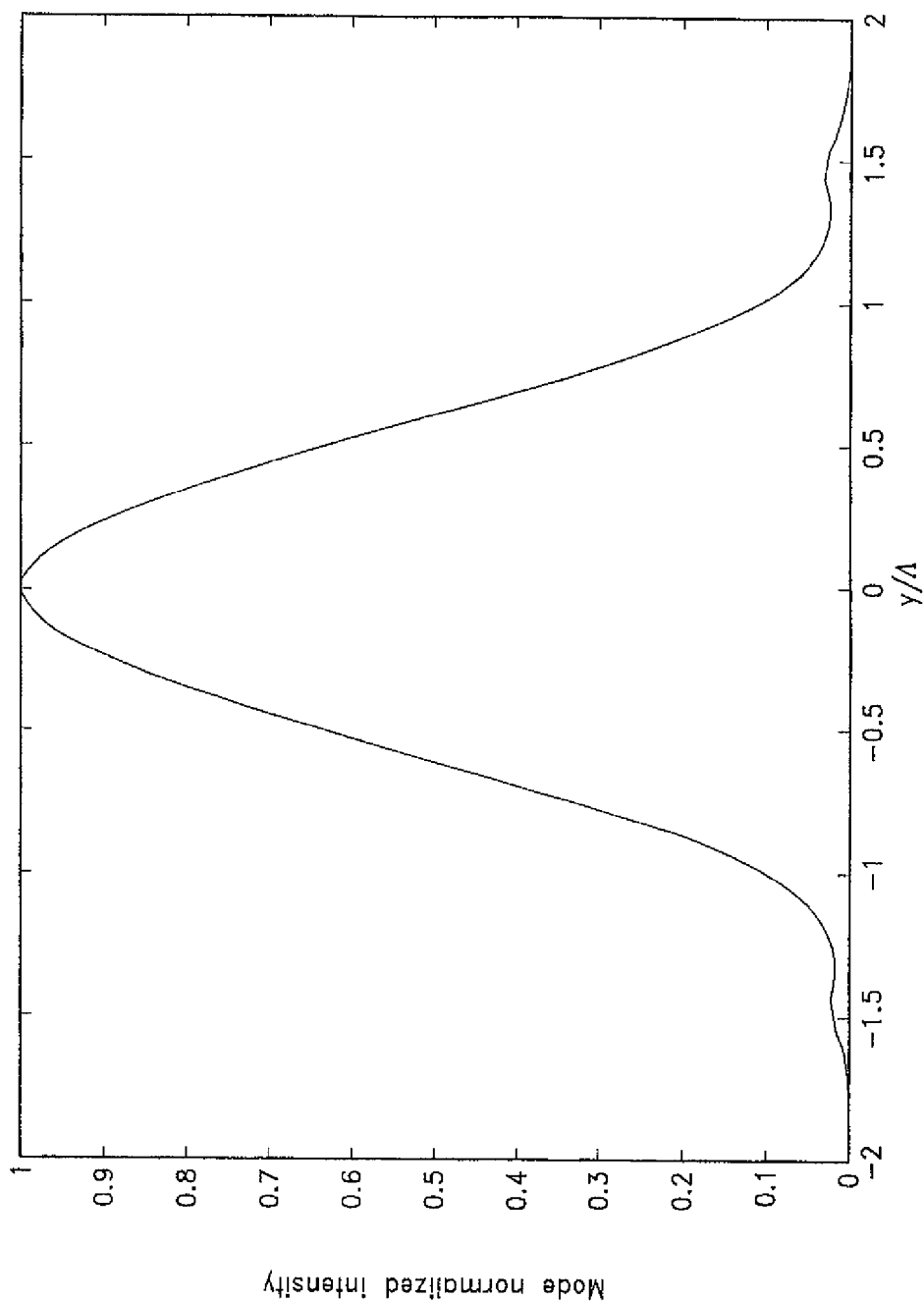
FIG. 8 illustrates a cross section of the core mode of FIGS. 7A and 7B in a line along $x=0$.

FIG. 6 shows the dispersion curve of a first PBF with a core radius $R=1.0\Lambda$ calculated using an exemplary method compatible with certain embodiments described herein. The bandgap extends approximately from $\lambda=0.56\Lambda$ to $\lambda=0.64\Lambda$. This bandgap supports two fundamental core modes (Gaussian-like $HE_{11}$ modes polarized along the fiber axes) and does not support surface modes, as expected from the particular choice of core profile and radius (see, e.g., M. J. F. Digonnet, H. K. Kim, J. Shin, S. H. Fan, and G. S. Kino, "*Simple geometric criterion to predict the existence of surface modes in air-core photonic-bandgap fibers,*" Optics Express, Vol. 12, No. 9, 3 May 2004, pages 1864-1872; and H. K. Kim, J. Shin, S. H. Fan, M. J. F. Digonnet, and G. S. Kino, "*Designing air-core photonic-bandgap fibers free of surface modes,*" IEEE Journal of Quantum Electronics, Vol. 40, No. 5, May 2004, pages 551-556). As is well-known, the fundamental core modes are mainly concentrated in air. FIGS. 7A and 7B show a contour map of the intensity profile $I=|E_x|^2+|E_y|^2$ of one of the fundamental core modes for a core radius of 0.8Λ. FIG. 7B is a magnified version of FIG. 7A. FIG. 8 shows an intensity profile (cut along x=0) of the fundamental core mode of FIGS. 7A and 7B. The fundamental core mode is not perfectly six-fold symmetric as expected from the photonic crystal symmetry due to its degeneracy with a mode which is polarized orthogonally. However, the fundamental core mode is symmetric about both the vertical axis (x=0) and the horizontal axis (y=0). Note that this profile exhibits peaks at the air-silica interface at the core boundary (y=±1.5Λ, as shown in FIG. 8). Such features are examples of the fine modal features that can be resolved by certain embodiments described herein which sample the exact refractive index distribution.

Figure 9:
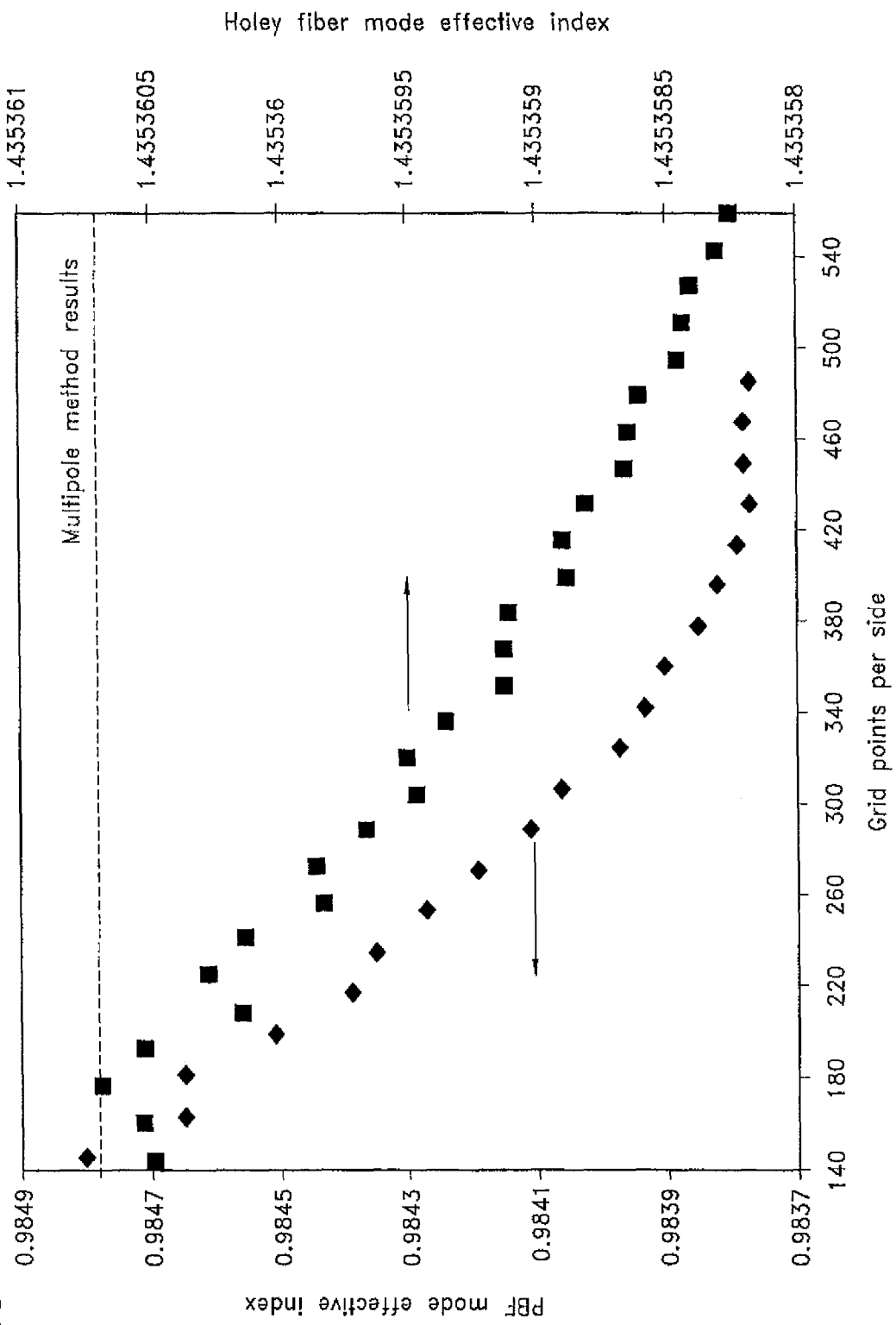
FIG. 9 illustrates the convergence for the exemplary method for increasing grid sizes for a PBF having $\rho=0.47\Lambda$ and $R=0.8\Lambda$ (diamond-shaped data points, referring to the leftmost vertical axis) and the convergence for the exemplary method for increasing grid sizes for the fiber described by Zhu et al. (square-shaped data points, referring to the rightmost vertical axis).

The convergence of this exemplary method is illustrated by FIG. 9, which shows the convergence of the fundamental core mode effective index as a function of the number of grid points for the PBF structure of FIG. 5 (shown in FIG. 9 by the diamond-shaped data points, and referring to the leftmost vertical axis). Convergence to the fifth decimal place is shown in FIG. 9 for a step size of Λ/50 (approximately 450 points per side) for the PBF structure of FIG. 5.

To assess its accuracy, the exemplary method was used to calculate the effective index of the fundamental mode of the air-assisted fiber previously calculated using the multipole method, as described by Z. Zhu and T. G. Brown, in "*Full-vectorial finite-difference analysis of microstructured optical fibers,*" Optics Express, 2002, Vol. 10, pages 853-864 ("Zhu et al.") and illustrated by FIG. 3 of Zhu et al. The results of the calculation using the exemplary method (shown in FIG. 9 by the square-shaped data points, and referring to the rightmost vertical axis) were compared to the values of the effective index calculated using the multipole method as reported by Zhu et al. (shown in FIG. 9 by the dashed line, and referring to the rightmost vertical axis). Table 1 lists the values obtained using the exemplary method with two different grid sizes, and the values previously reported for the multipole method by Zhu et al.

TABLE 1

| Solution Method | Exemplary method; 160 points per side | Exemplary method; 256 points per side | Multipole method of Zhu et al. |
|---|---|---|---|
| Fundamental mode effective index | 1.43536053 | 1.43535983 | 1.4353607 |

As shown in Table 1, accuracy to the fifth decimal place is achieved by the exemplary method for a grid of 160 points per side. The mode effective index calculated with the exemplary method using 256 grid points (1.43535983) differs from the value calculated with the multipole method (1.4353607) by only about $9 \times 10^{-7}$. FIG. 9 also illustrates the convergence for the exemplary method for increasing grid sizes for the fiber illustrated by FIG. 3 of Zhu et al. (shown in FIG. 9 by square-shaped data points). The convergence achieved is better than seventh decimal (for 550 grid points per side) and the accuracy is of comparable order. These results confirm both the accuracy and the convergence of the exemplary method.

Figure 10:
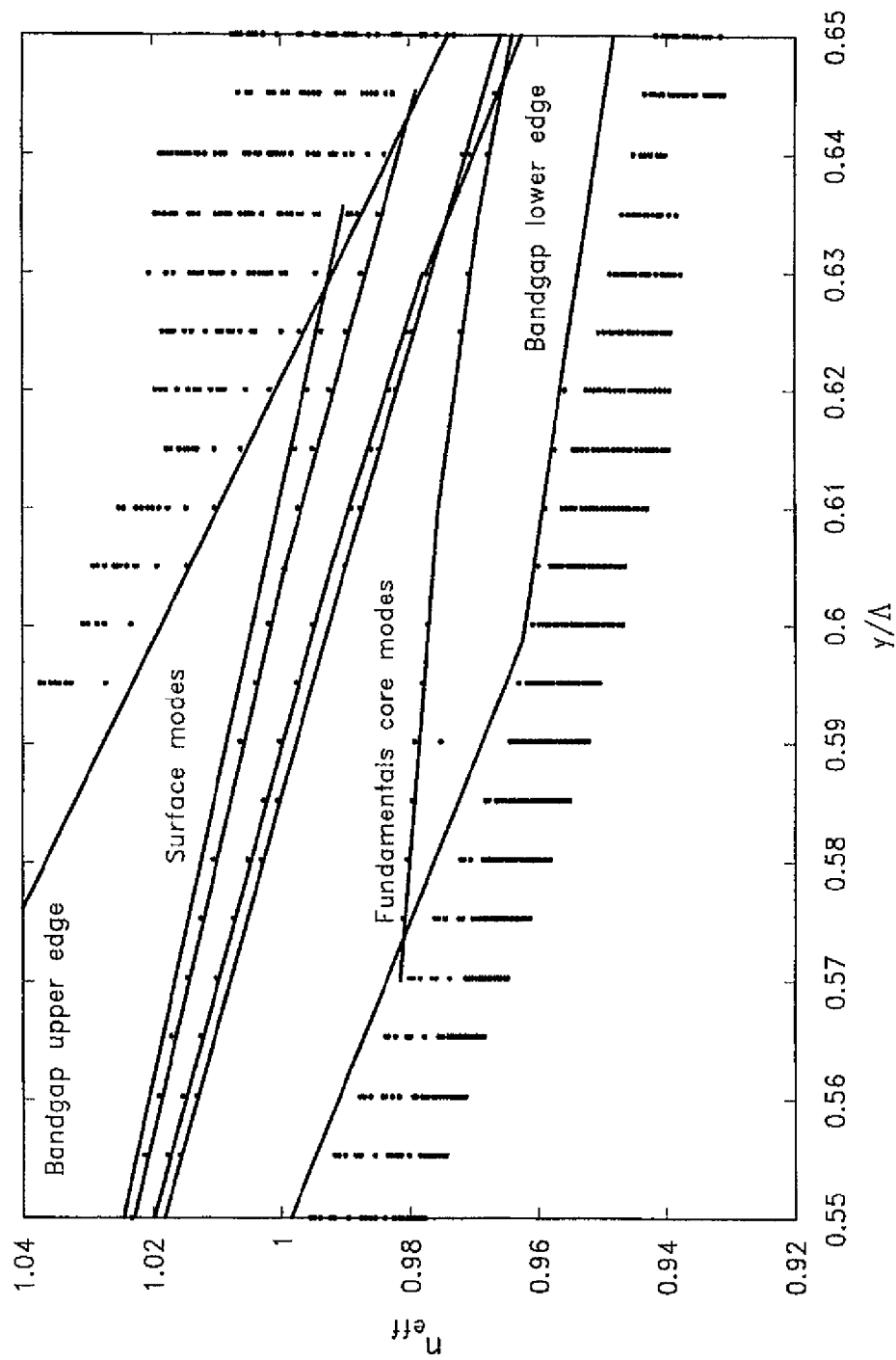
FIG. 10 shows a calculated band profile and dispersion for a PBF having $\rho=0.47\Lambda$ and $R=1.15\Lambda$.
Figure 11A:
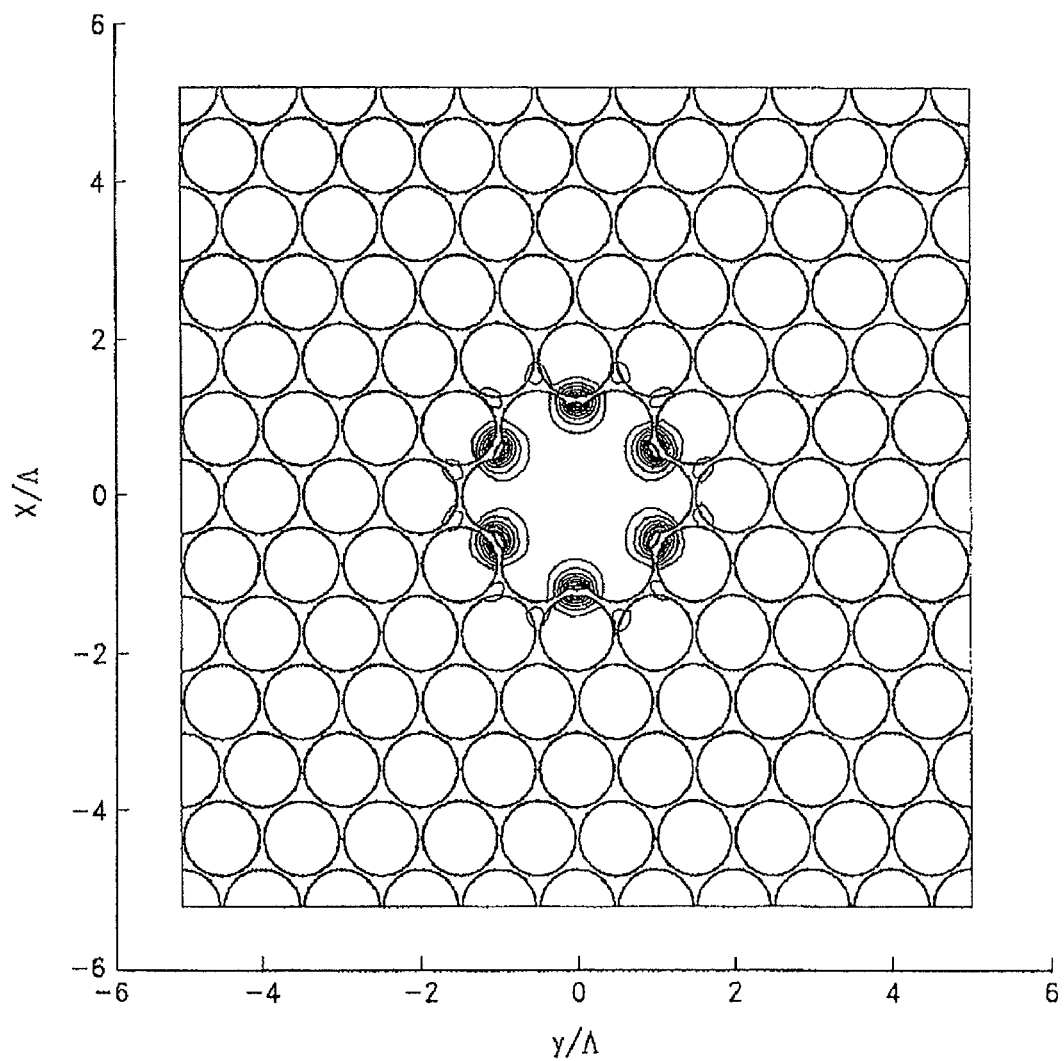
FIGS. 11A and 11B illustrate a calculated mode profile of a surface mode for the PBF of FIG. 10 at $\rho=0.47\Lambda$, $R=1.15\Lambda$ and $\lambda=0.60\Lambda$.
Figure 11B:
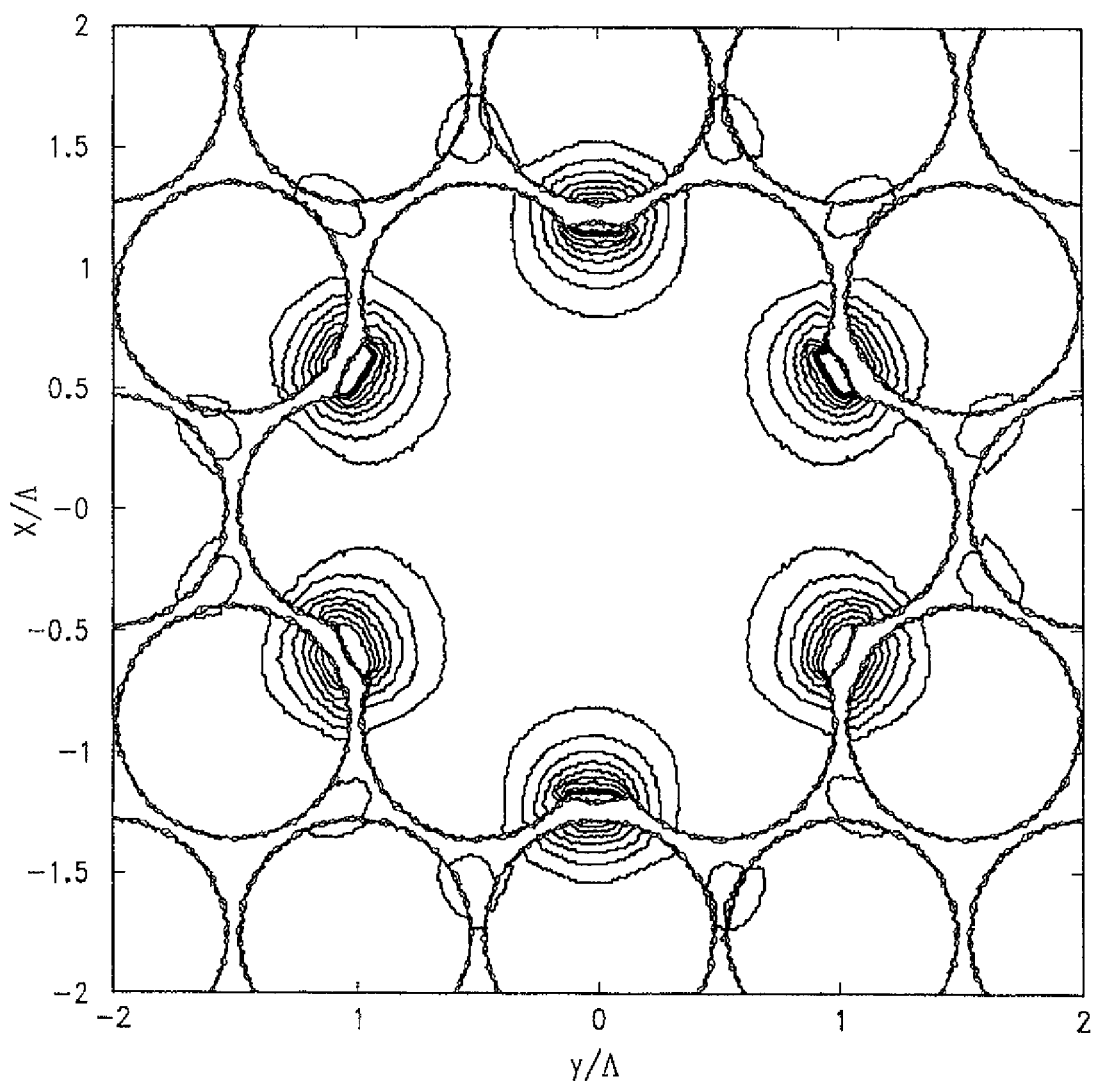

FIG. 10 shows the calculated dispersion diagram of a second PBF having a core radius of R=1.15Λ. This fiber exhibits surface modes, which is consistent with previously published results (see, e.g., M. J. F. Digonnet, H. K. Kim, J. Shin, S. H. Fan, and G. S. Kino, "Simple geometric criterion to predict the existence of surface modes in air-core photonic-bandgap fibers," Optics Express, Vol. 12, No. 9, 3 May 2004, pages 1864-1872; and H. K. Kim, J. Shin, S. H. Fan, M. J. F. Digonnet, and G. S. Kino, "Designing air-core photonic-bandgap fibers free of surface modes," IEEE Journal of Quantum Electronics, Vol. 40, No. 5, May 2004, pages 551-556). As shown in the intensity contour map of the exemplary surface mode of FIGS. 11A and 11B, these surface modes are localized at the interface between the air core and first layer of cladding air holes. The fields of these surface modes have their maxima in the silica and are evanescent in air. The surface mode shown in FIGS. 11A and 11B exhibit the six-fold symmetry expected from the fiber symmetry. These results are consistent with previously reported PBF mode behavior.

For simulations of PBFs, certain embodiments advantageously minimize the total computation time by solving for a large number of modes of the structure (e.g., approximately 40) around a target effective index (e.g., $n_0=1$ or 0.99) until a core mode is found. Since the effective indices of core modes are not known prior to the simulation, in certain embodiments, this calculation of a large number of modes is performed to find the core modes at a particular wavelength. Once the core mode effective indices have been determined at a given wavelength, each of these effective indices can be used as the target effective index of the corresponding mode at the next (or nearby) wavelength, or an extrapolation (e.g., linear) can be used to estimate the target effective index. When the effective index of a given mode has been calculated at two (or more) wavelengths, either a linear or a spline interpolation technique (or an equivalent technique) can be used to estimate the target effective index. In certain embodiments, the number of modes solved at this wavelength can then be lowered (e.g., to less than 20, since in general only the core modes, surface modes, and a few bulk modes at the edges of the bandgap are of interest). Certain such embodiments advantageously reduce the computation time by tracking a particular mode of interest, and advantageously center the calculated modes around the core modes.

Certain embodiments described herein provide a new photonic-bandgap fiber mode solver which simulates the modes of air-core photonic-bandgap fibers of arbitrary index profiles quickly using a personal computer while reducing the amount of data storage used by about two orders of magnitude. In certain embodiments, the effective indices and field profiles of the modes of a typical PBF at a particular wavelength can be calculated in approximately 10 seconds per mode on a personal computer with 3.2 gigabytes of RAM. In certain embodiments, these substantial improvements are accomplished by (1) solving a vectorial transverse-magnetic-field equation in a matrix form, which can be done quickly using a sparse matrix; (2) re-arranging the matrix elements to reduce the matrix bandwidth, which further speeds up the calculation by another factor of at least one order of magnitude; and (3) solving exclusively for the modes of interest. Certain embodiments described herein are advantageously simple to program (e.g., about 200 lines of MATLAB® code), can be advantageously used in conjunction with one of several types of boundary conditions, and are advantageously applicable to calculate the modes of any optical fiber of waveguide, regardless of the complexity of its index profile.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

Listed below are exemplary MATLAB® code portions which can be used to implement a method compatible with certain embodiments described herein for calculating the modal properties of a waveguide. In particular, exemplary code portion "mode_hex" is compatible with periodic boundary conditions, and exemplary code portion "mode_rec" is compatible with rectangular boundary conditions.

The exemplary code portions listed herein contain material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

Exemplary Code Portion "mode_hex"

Exemplary code portion "mode_hex" can be used to solve for eigenvalues and eigenvectors for hexagonal boundaries:

```
function nakapuf=mode_hex(filen,wa1,wa2,was,modes,nint)
%2D cartesian coordinates mode solver
%Hexagonal boundary
%Sparse matrix implementation
%Transverse magnetic field is solved using its eigenvalue equation
%clear
%filen=input('Refractive index filename: ','s') ;
load(filen)
% wa1=input('Start wavelength: ') ;
%
% wa2=input('Finish wavelength: ') ;
%
% was=input('Wavelength step: ') ;
% modes=input('Number of modes to calculate: ') ;
%
% nint=input('Effective index of interest: ') ;
lam=wa1:was:wa2 ;
```

```
outb=strcat(filen,'_buffer.mat');
S=length(K);
clear si
[Lx,Ly]=grad_h(log(refh.^2),Xh,Yh,Pxp,Pxm,Pyp,Pym,sx,sy);
'done phase 1'
for m0=1:length(lam),
    load(filen)
    lamb=lam(m0);
    k0=2*pi/lamb;
    subname=strcat(filen,'_mode_',num2str(m0));
    l=1;
    ind=1:S;
    ind0=0*ind;
    i=[ind ind+S ind ind ind ind ind ind ind+S ind+S ind+S ind+S ind+S ind+S ind+S];
    j=[ind ind+S Pxp' Pxm' Pyp' Pym' Pxp'+S Pxm'+S Pxm'+S Pxp'+S Pyp'+S Pym'+S Pyp' Pym'];
    s=[-2/sx^2-2/sy^2+k0^2*refh.^2    -2/sx^2-2/sy^2+k0^2*refh.^2
1/sx^2+ind0
1/sx^2+ind0    1/sy^2-0.5*Ly(ind)./sy    1/sy^2+0.5*Ly(ind)./sy
0.5*Ly(ind)./sx -
0.5*Ly(ind)./sx    1/sx^2+0.5*Lx(ind)./sx    1/sx^2-0.5*Lx(ind)./sx
1/sy^2+ind0
1/sy^2+ind0 0.5*Lx(ind)./sy -0.5*Lx(ind)./sy];
    clear Pxp Pxm Pyp Pym ind0 ind.
'done phase 2'
M0=sparse(i,j,s);
'done phase 3'
p=symrcm(M0);
'done phase 4'
M1=M0(p,p);
save(outb,'M0','i','j','s');
clear M0 i j s
'done phase 5'
[V,D]=eigs(M1,modes,nint^2*k0^2);
'done phase 6'
d=diag(D);
[d0,li]=sort(d);
d=flipdim(d0,1);
for i0=1:length(d),
    nef = sqrt(d(i0)/k0^2);
    NEFF(m0,i0) = nef;
    neff(i0)=nef;
    W(p,i0)=V(:,li(length(d)+1-i0));
    beta(m0,i0) = k0*nef;
end
clear V
save(subname,'W','neff','lamb','ref','xv','yv');
clear neff W
'done phase 7'
m0
end
outp=strcat(filen,'_solut.mat');
save(outp,'NEFF','beta','lam','ref')
return
```

Exemplary Code Portion: "mode_rec"

Exemplary code portion "mode_rec" can be used to solve for eigenvalues and eigenvectors for rectangular boundaries:

```
function nakapuf=mode_rec(filen,wa1,wa2,was,modes,nint)
%2D cartesian coordinates mode solver
%Sparse matrix implementation
%Transverse magnetic field is solved using its eigenvalue equation
% clear
%
% filen=input('Refractive index filename: ','s');
load(filen)
% wa1=input('Start wavelength: ');
%
% wa2=input('Finish wavelength: ');
%
% was=input('Wavelength step: ');
%
% modes=input('Number of modes to calculate: ');
%
% nint=input('Effective index of interest: ');
lam=wa1:was:wa2;
%contains 2D refractive index matrix, spatial step size s0
si=size(ref);
Nx=si(1);
Ny=si(2);
clear si
[Lx,Ly]=gradxy(log(ref.^2),sx,sy);
'done phase 1'
%generation of sparse matrix i,j,s
for m0=1:length(lam),
    lamb=lam(m0);
    k0=2*pi/lamb;
    subname=strcat(filen,'_mode_',num2str(m0));
    l=1;
    S=Nx*Ny;
    ind=1:S;
    [Y,X]=meshgrid(1:Ny,1:Nx);
    Z=X+Nx*(Y-1);
    Zin=Z((2:Nx-1),(2:Ny-1));
    indi=Zin(1:(Nx-2)*(Ny-2));
    indi0 = 0*indi;
    ib=[ind ind+S indi indi indi indi indi indi indi+S indi+S indi+S indi+S indi+S indi+S indi+S];
    jb=[ind ind+S indi+1 indi-1 indi+Nx indi-Nx indi+1+S indi-1+S indi-1+S indi+1+S indi+Nx+S indi-Nx+S indi+Nx indi-Nx];
    sb=[-2/sx^2-2/sy^2+k0^2*ref(ind).^2    -2/sx^2-2/sy^2+k0^2*ref(ind).^2
1/sx^2+indi0    1/sx^2+indi0    1/sy^2-0.5*Ly(indi)./sy    1/sy^2+0.5*Ly(indi)./sy
0.5*Ly(indi)./sx -0.5*Ly(indi)./sx 1/sx^2+0.5*Lx(indi)./sx 1/sx^2-0.5*Lx(indi)./sx
```

```
    upb=1+Nx*(1:Ny-2);
    downb=Nx+Nx*(1:Ny-2);
    leftb=(2:Nx-1);
    rightb=Nx*(Ny-1)+(2:Nx-1);
    b0=0*upb;
    b0y=0*leftb;
    'done phase 2'
    i=[ib upb upb upb upb upb+S upb+S upb+S upb+S upb+S];
    j=[jb upb+1 upb+Nx upb-Nx upb+1+S upb+1+S upb+Nx+S upb-Nx+S upb+Nx upb-Nx];
    s=[sb 1/sx^2+b0 1/sy^2-0.5*Ly(upb)./sy 1/sy^2+0.5*Ly(upb)./sy 0.5*Ly(upb)./sx
1/sx^2-0.5*Lx(upb)./sx 1/sy^2+b0 1/sy^2+b0 0.5*Lx(upb)./sy -0.5*Lx(upb)./sy];
    ib1=i; jb1=j; sb1=s;
    i=[ib1 downb downb downb downb downb+S downb+S downb+S downb+S downb+S];
    j=[jb1 downb-1 downb+Nx downb-Nx downb-1+S downb-1+S downb+Nx+S downb-Nx+S
downb+Nx downb-Nx];
    s=[sb1 1/sx^2+b0 1/sy^2-0.5*Ly(downb)./sy 1/sy^2+0.5*Ly(downb)./sy -
0.5*Ly(downb)./sx 1/sx^2+0.5*Lx(downb)./sx 1/sy^2+b0 1/sy^2+b0 0.5*Lx(downb)./sy -
0.5*Lx(downb)./sy];
    ib2=i; jb2=j; sb2=s;
    i=[ib2 leftb leftb leftb leftb leftb leftb+S leftb+S leftb+S leftb+S];
    j=[jb2 leftb+1 leftb-1 leftb+Nx leftb+1+S leftb-1+S leftb-1+S leftb+1+S
leftb+Nx+S leftb+Nx];
    s=[sb2, 1/sx^2+b0y, 1/sx^2+b0y, 1/sy^2-0.5*Ly(leftb)./sy, 0.5*Ly(leftb)./sx, -
0.5*Ly(leftb)./sx, 1/sx^2+0.5*Lx(leftb)./sx, 1/sx^2-0.5*Lx(leftb)./sx, 1/sy^2+b0y,
0.5*Lx(leftb)./sy];
    ib3=i; jb3=j; sb3=s;
    i=[ib3 rightb rightb rightb rightb rightb rightb+S rightb+S rightb+S rightb+S]
;
    j=[jb3 rightb+1 rightb-1 rightb-Nx rightb+1+S rightb-1+S rightb-1+S rightb+1+S
rightb-Nx+S rightb-Nx];
    s=[sb3 1/sx^2+b0y 1/sx^2+b0y 1/sy^2+0.5*Ly(rightb)./sy 0.5*Ly(rightb}./sx -
0.5*Ly(rightb)./sx 1/sx^2+0.5*Lx(rightb)./sx 1/sx^2-0.5*Lx(rightb)./sx 1/sy^2+b0y -
0.5*Lx(rightb)./sy];
    ib4=i; jb4=j; sb4=s;
    indur=1-Nx+S;
    indll=Nx;
    indlr=S;
    i=[ib4 1 1 1 1+S 1+S 1+S indur indur indur indur+S indur+S indur+S indll indll
indll indll+S indll+S indll+S indlr indlr indlr indlr+S indlr+S indlr+S];
    j=[jb4 2 1+Nx 1+Nx+S 2+S 1+Nx+S 1+Nx indur+1 indur-Nx indur+1+S indur+1+S
indur-Nx+S indur-Nx indll-1 indll+Nx indll-1+S indll-1+S indll+Nx+S indll+Nx indlr-
1 indlr-Nx indlr-1+S indlr-1+S indlr-Nx];
    s=[sb4 1/sx^2 1/sy^2-0.5*Ly(1)/sy 0.5*Ly(1)/sy 1/sx^2-0.5*Lx(1)/sx 1/sy^2
0.5*Lx(1)/sy 1/sx^2 1/sy^2+0.5*Ly(indur)/sy 0.5*Ly(indur)/sx 1/sx^2-
0.5*Lx(indur)/sx 1/sy^2 -0.5*Lx(indur)/sy 1/sx^2 1/sy^2-0.5*Ly(indll)/sy -
0.5*Ly(indll)/sx 1/sx^2+0.5*Lx(indll)/sx 1/sy^2 0.5*Lx(indll)/sy 1/sx^2
1/sy^2+0.5*Ly(indlr)/sy -0.5*Ly(indlr)/sx 1/sx^2+0.5*Lx(indlr)/sx 1/sy^2 -
0.5*Lx(indlr)/sy];
    clear ib jb sb ib1 jb1 sb1 ib2 ib3 ib4 jb2 jb3 jb4 sb2 sb3 sb4
    'done phase 3'
    %1
    M0=sparse(i,j,s);
    'done phase 4'
    p=symrcm(M0);
    'done phase 5'
    M1=M0(p,p);
    %spy(M1)
    'done phase 6'
    outb=strcat(filen,'_buffer.mat');
    save(outb,'M0','i','j','s')
    clear M0 i j s
    [V,D]=eigs(M1,modes,nint^2*k0^2);
    'done phase 7'
    d=diag(D);
    [d0,li]=sort(d);
    d=flipdim(d0,1);
    for i0=1:length(d),
        nef = sqrt(d(i0)/k0^2);
        NEFF(m0,i0) = nef;
        neff(i0)=nef;
        W(p,i0)=V(:,li(length(d)+1-i0));
        %[hx,hy]=remap(W(:,i0));
        beta(m0,i0) = k0*nef;
    end
    save(subname,'W','neff','lamb','ref','xv','yv');
end
outp=strcat(filen,'_solut.mat');
save(outp,'NEFF', 'beta','lam','ref')
```

What is claimed is:

1. A method for modeling one or more electromagnetic field modes of a waveguide, the method comprising:
    calculating, using a processor, a first matrix using a refractive index profile of the waveguide, the first matrix comprising a plurality of elements and having a first bandwidth, the plurality of elements of the first matrix stored in computer memory and representing an action of Maxwell's equations on a transverse magnetic field within the waveguide;
    rearranging the plurality of elements of the first matrix stored in computer memory to form a second matrix having a second bandwidth smaller than the first bandwidth;
    shifting the second matrix and inverting the shifted second matrix to form a third matrix;
    calculating one or more eigenvalues or eigenvectors of the third matrix corresponding to one or more modes of the waveguide; and
    calculating one or more propagation losses corresponding to the one or more modes of the waveguide using boundary conditions which comprise surrounding a simulation domain of the method by an absorbing material.

2. The method of claim 1, wherein the waveguide comprises a photonic-bandgap fiber.

3. The method of claim 1, wherein the waveguide comprises an air-core photonic-bandgap fiber.

4. The method of claim 1, wherein the refractive index profile is translation invariant along a longitudinal axis of the waveguide.

5. The method of claim 1, wherein the refractive index profile is digitized.

6. The method of claim 1, wherein the waveguide comprises an air-core photonic-bandgap fiber having a longitudinal axis, an air core and a cladding structure comprising air holes and intervening membranes, and the refractive index profile has a digitized air core and cladding structure in a planar cross-section which is perpendicular to the longitudinal axis.

7. The method of claim 6, wherein the refractive index profile is sampled over an area corresponding to a minimum cell that is a fundamental component of the cladding structure.

8. The method of claim 1, wherein calculating the first matrix comprises defining boundary conditions.

9. The method of claim 1, wherein calculating the first matrix comprises discretizing an eigenvalue equation satisfied by the transverse magnetic field, the discretizing being performed using Maxwell's equations as expressed by $$\vec{\nabla} \times \vec{E} = \frac{-\partial \vec{B}}{\partial t},$$

$$\vec{\nabla} \times \vec{H} = \frac{\partial \vec{D}}{\partial t}, \text{ and}$$

$$\vec{\nabla} \cdot \vec{H} = 0.$$

10. The method of claim 9, wherein discretizing the eigenvalue equation further comprises index-averaging over each discretization pixel straddling an air-core boundary.

11. The method of claim 9, wherein the waveguide comprises an air-core photonic-bandgap fiber having a longitudinal axis, an air core and a cladding structure comprising air holes and intervening membranes, and wherein discretizing the eigenvalue equation comprises sampling two components of the transverse magnetic field in a planar cross-section of the waveguide.

12. The method of claim 11, wherein sampling the two components of the transverse magnetic field is performed over an area corresponding to a minimum cell that is a fundamental component of the cladding structure.

13. The method of claim 1, wherein calculating the first matrix comprises sampling a linear operator corresponding to the action of Maxwell's equations on a transverse magnetic field within the waveguide.

14. The method of claim 1, wherein inverting the shifted second matrix comprises using an LU decomposition.

15. The method of claim 1, wherein calculating one or more eigenvalues or eigenvectors of the third matrix comprises calculating only a selected number of the largest eigenvalues of the third matrix.

16. The method of claim 1, wherein calculating one or more eigenvalues or eigenvectors of the third matrix comprises using finite-difference or finite-element calculations.

17. The method of claim 1, wherein the waveguide comprises a photonic-bandgap fiber having a bandgap and calculating one or more eigenvalues or eigenvectors of the third matrix comprises finding one or more modes of the photonic-bandgap fiber, the one or more modes comprising at least one core mode, surface mode, ring mode, or bulk mode.

18. The method of claim 1, wherein the first matrix comprises a first diagonal of elements each having its two indices equal to one another, and wherein the plurality of elements comprises non-zero elements having non-zero values, the first bandwidth being a maximum distance between the non-zero elements and the first diagonal of the first matrix.

19. The method of claim 1, further comprising displaying information regarding the one or more propagation losses to model the one or more electromagnetic field modes of the waveguide.

20. A non-transitory tangible computer-readable medium having instructions stored thereon which cause a general-purpose computer to perform a method for modeling one or more electromagnetic field modes of a waveguide, the method comprising:
    calculating a first matrix using a refractive index profile of the waveguide, the first matrix comprising a plurality of elements and having a first bandwidth, the plurality of elements of the first matrix stored in computer memory and representing an action of Maxwell's equations on a transverse magnetic field within the waveguide;
    rearranging the plurality of elements of the first matrix stored in computer memory to form a second matrix having a second bandwidth smaller than the first bandwidth;
    shifting the second matrix and inverting the shifted second matrix to form a third matrix;
    calculating one or more eigenvalues or eigenvectors of the third matrix corresponding to one or more modes of the waveguide; and
    calculating one or more propagation losses corresponding to the one or more modes of the waveguide using boundary conditions which comprise surrounding a simulation domain of the method by an absorbing material.

21. A computer system for modeling one or more electromagnetic field modes of a waveguide, the computer system comprising:
    means for calculating a first matrix having a first bandwidth using a refractive index profile of the waveguide, the first matrix comprising a plurality of elements representing an action of Maxwell's equations on a transverse magnetic field within the waveguide;

means for rearranging the plurality of elements of the first matrix to form a second matrix having a second bandwidth smaller than the first bandwidth;
means for shifting the second matrix and inverting the shifted second matrix to form a third matrix;
means for calculating one or more eigenvalues or eigenvectors of the third matrix corresponding to one or more modes of the waveguide; and means for calculating one or more propagation losses corresponding to the one or more modes of the waveguide using boundary conditions which comprise surrounding a simulation domain of the modeling by an absorbing material.

\* \* \* \* \*